(12) United States Patent
Xiang et al.

(10) Patent No.: US 6,173,604 B1
(45) Date of Patent: Jan. 16, 2001

(54) SCANNING EVANESCENT ELECTRO-MAGNETIC MICROSCOPE

(75) Inventors: Xiao-Dong Xiang; Chen Gao, both of Alameda, CA (US)

(73) Assignee: The Regents of the University of California, Oakland, CA (US)

( * ) Notice: Under 35 U.S.C. 154(b), the term of this patent shall be extended for 0 days.

(21) Appl. No.: 09/158,037

(22) Filed: Sep. 22, 1998

Related U.S. Application Data

(63) Continuation-in-part of application No. 08/717,321, filed on Sep. 20, 1996, now Pat. No. 5,821,410
(60) Provisional application No. 60/059,471, filed on Sep. 22, 1997.

(51) Int. Cl.[7] .................................................. G01B 7/34
(52) U.S. Cl. ............................................ 73/105; 250/306
(58) Field of Search ................................ 73/105; 250/306

(56) References Cited

PUBLICATIONS

"Scanning Tip Microwave Near–Field Microscope", T. Wei and X–D Xiang, Appl. Phys. Lett. 68 (24), Jun. 10, 1996, pp. 3506–3508.

"Nondestructive Imaging of Dielectric–Constant Profiles and Ferroelectric Domains with a Scanning–Tip Microwave Near–Field Microscope", Yalin Lu, et al., Science, 27, Jun. 1997, vol. 276, pp. 2004–2006.

Tabib–Azar, et al., "Non–Destructive Characterization of Materials by Evanescent Microwaves", Meas. Sci. Technology, vol. 4, 1993, pp. 583–590.*

* cited by examiner

*Primary Examiner*—Daniel S. Larkin
(74) *Attorney, Agent, or Firm*—Coudert Brothers

(57) ABSTRACT

A novel scanning microscope is described that uses near-field evanescent electromagnetic waves to probe sample properties. The novel microscope is capable of high resolution imaging and quantitative measurements of the electrical properties of the sample. The inventive scanning evanescent wave electromagnetic microscope (SEMM) can map dielectric constant, tangent loss, conductivity, complex electrical impedance, and other electrical parameters of materials. The quantitative map corresponds to the imaged detail. The novel microscope can be used to measure electrical properties of both dielectric and electrically conducting materials.

15 Claims, 18 Drawing Sheets

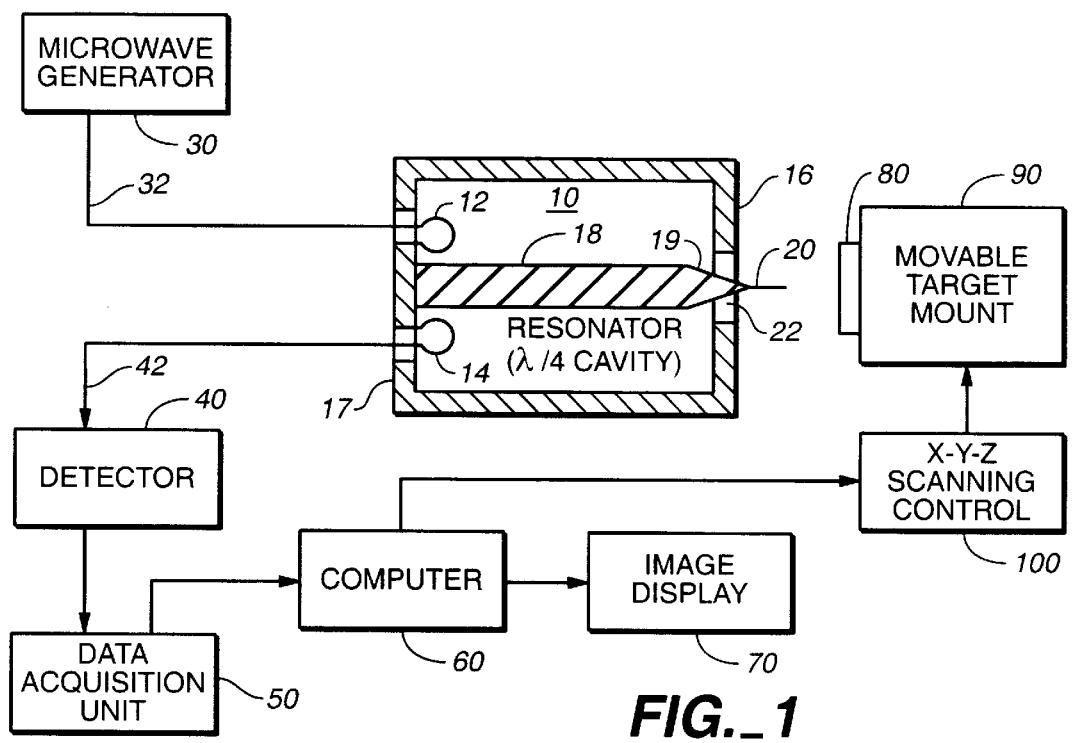
FIG._1

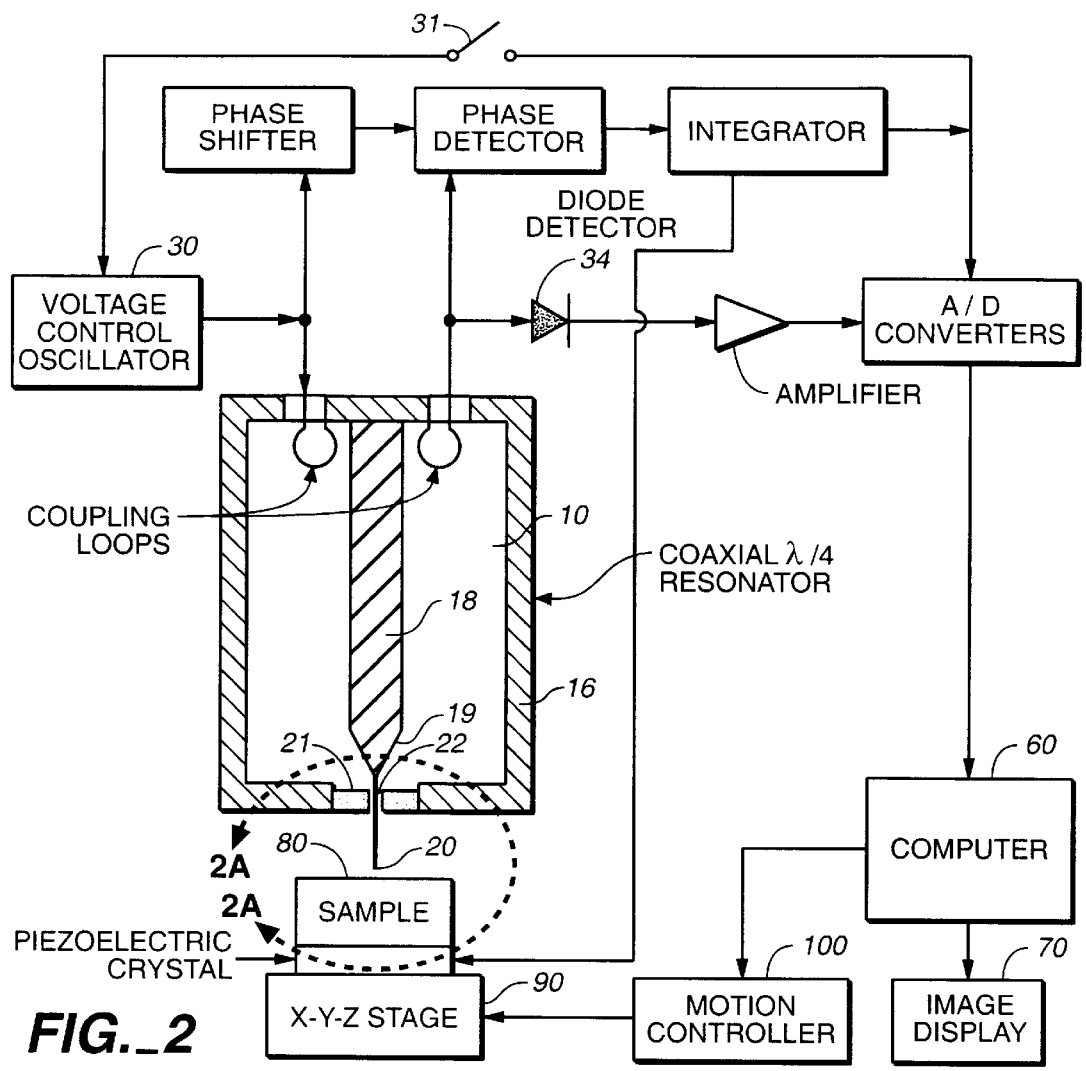
FIG._2
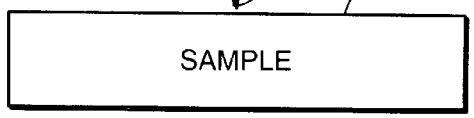
FIG._2A

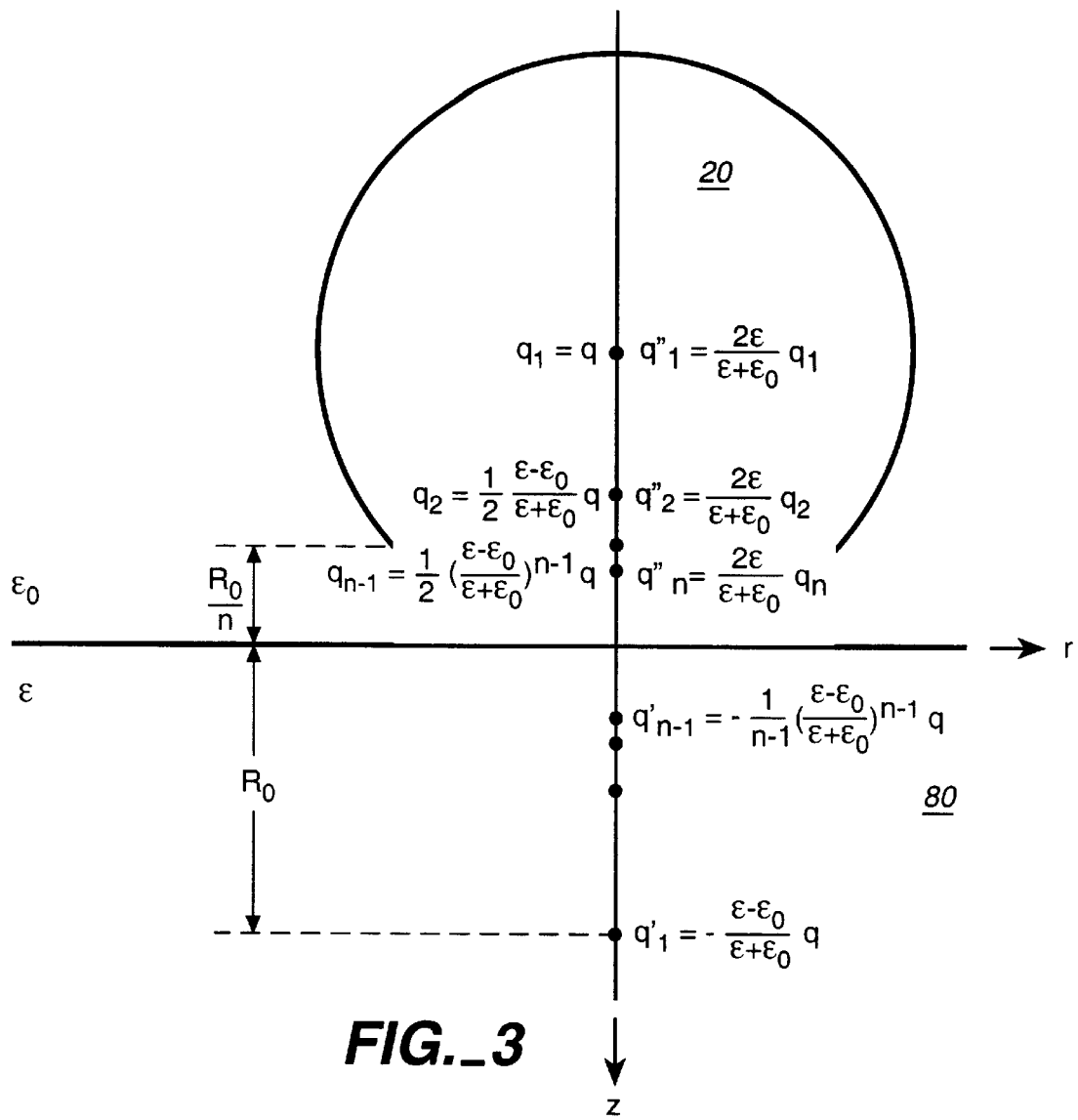
FIG._3

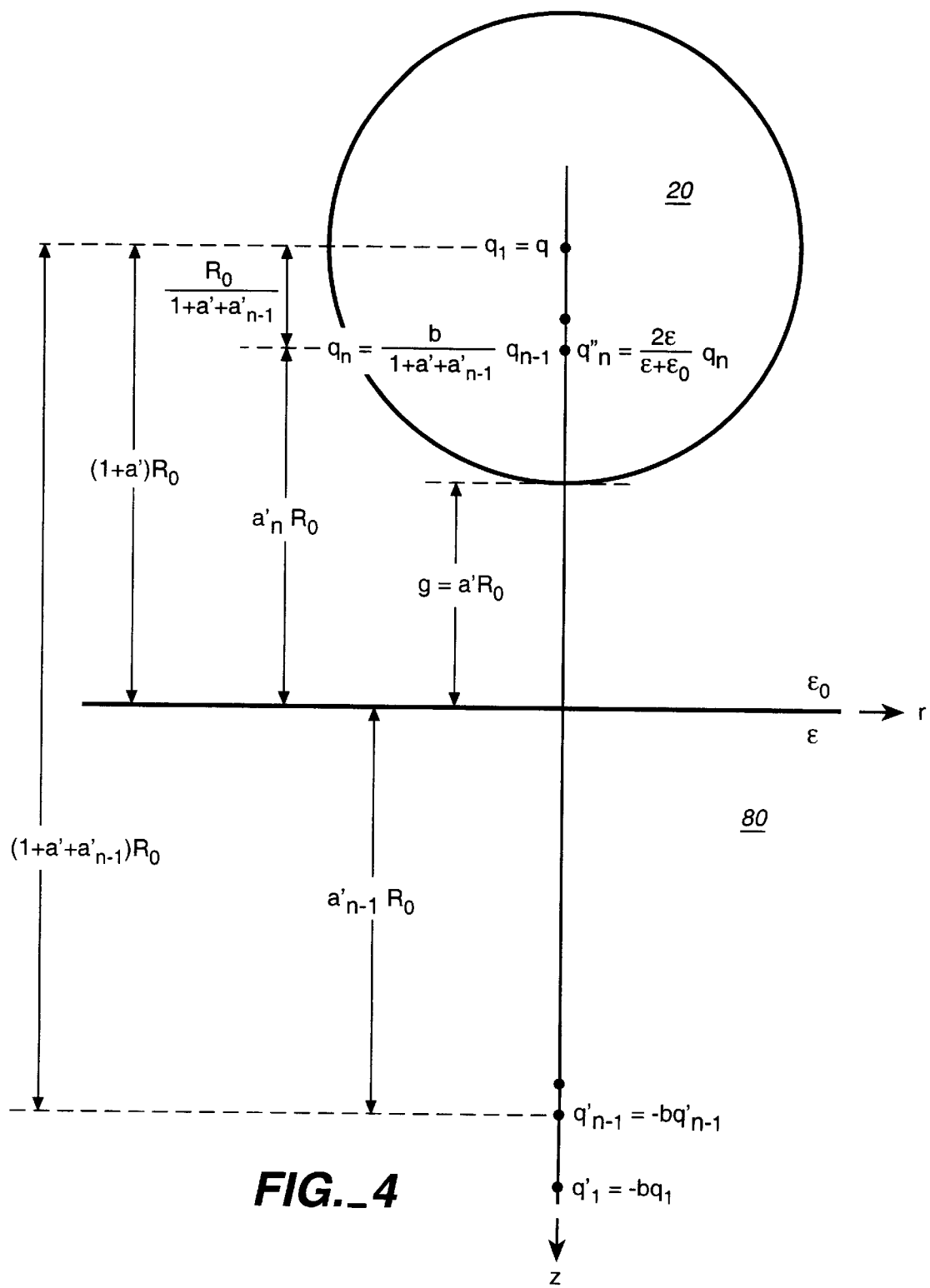
FIG._4

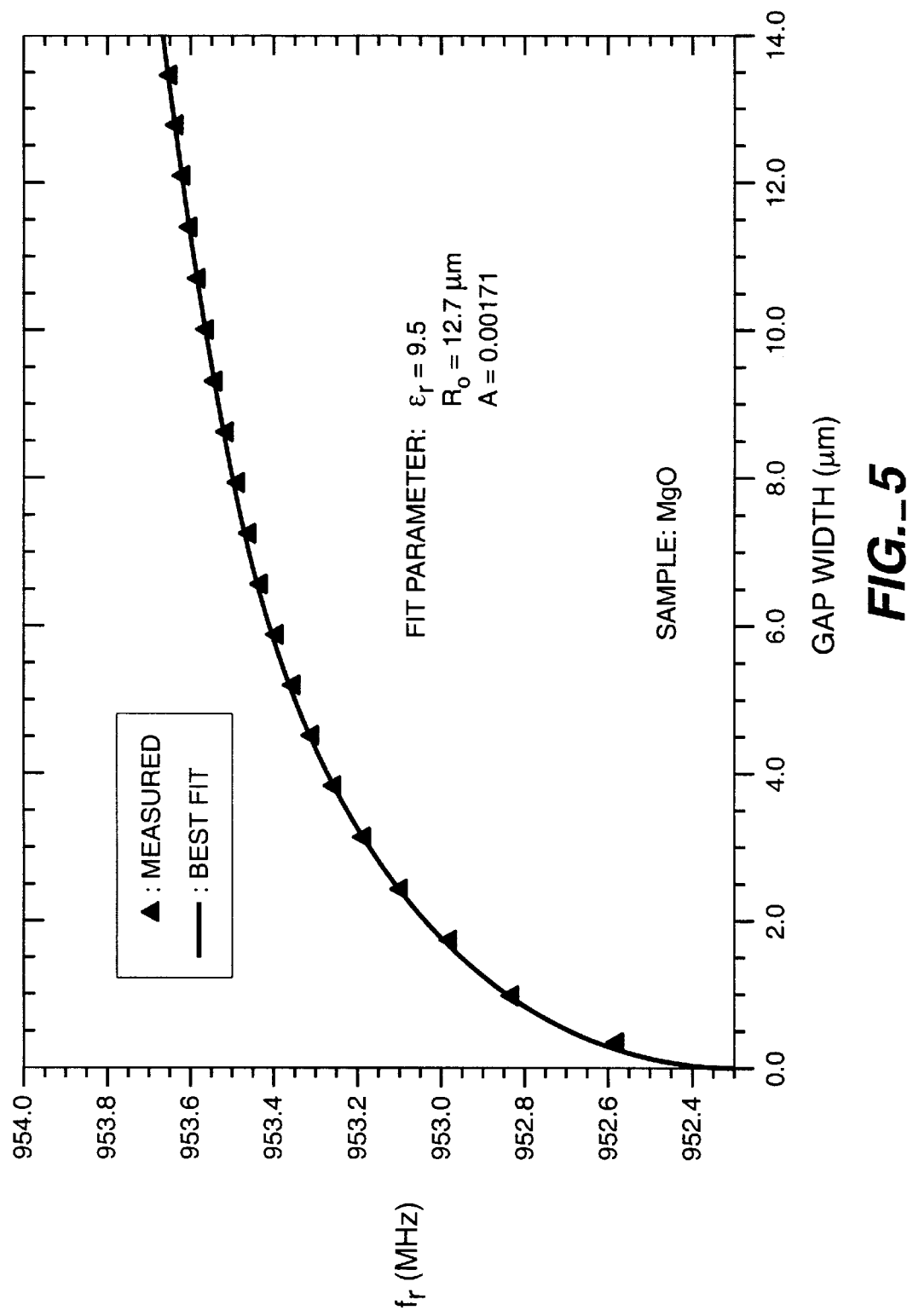
FIG._5

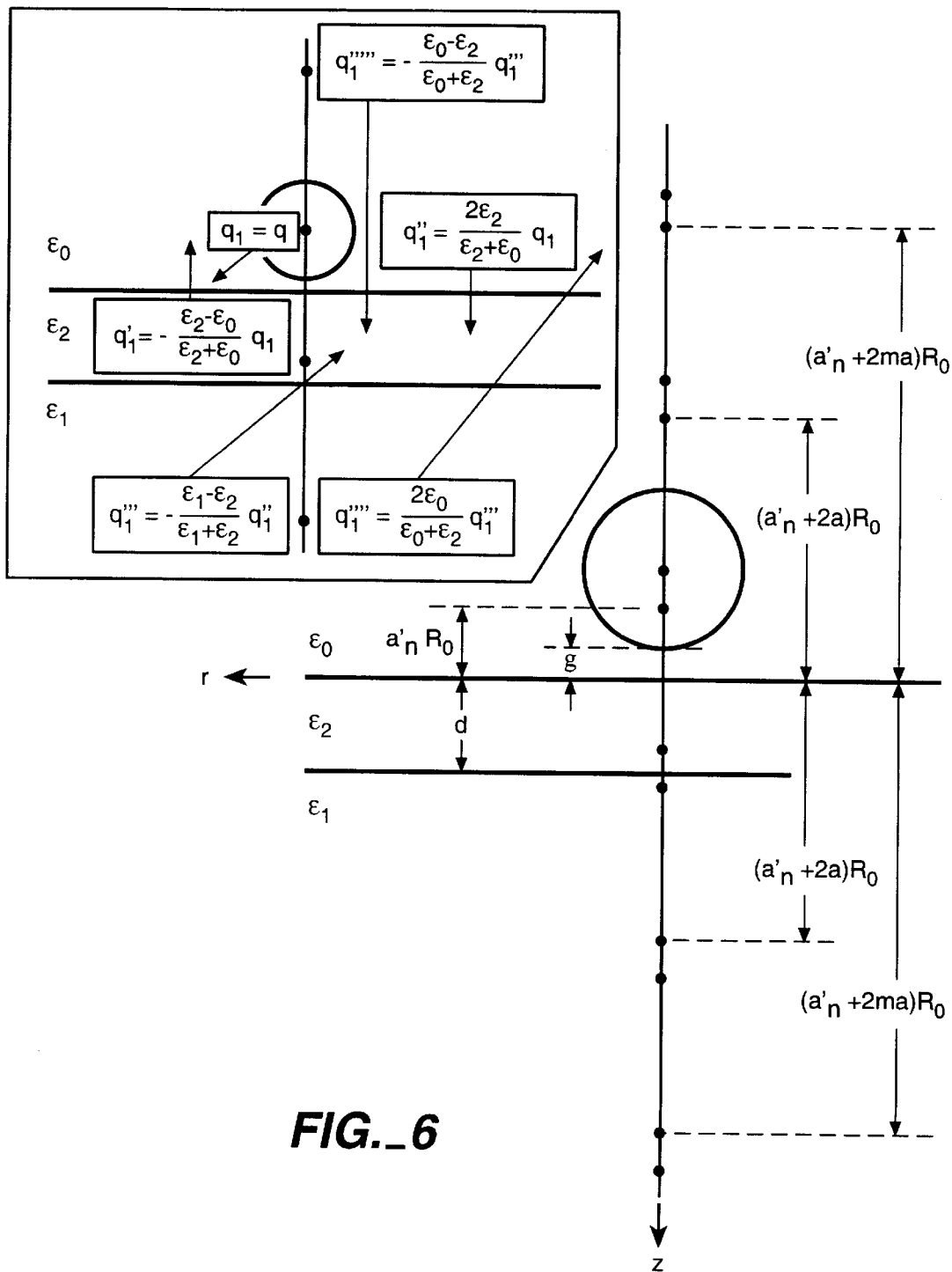
FIG._6

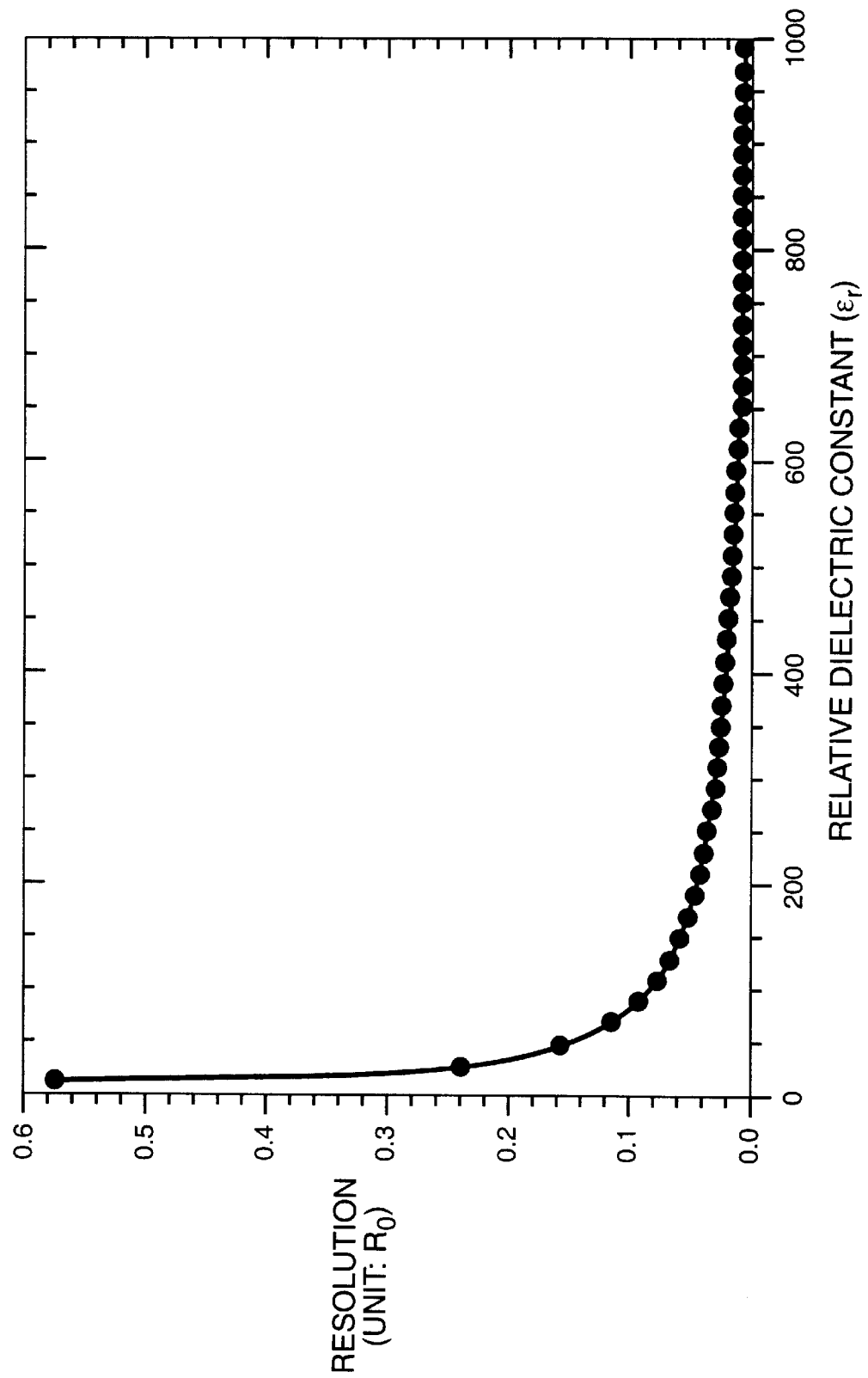
FIG._7

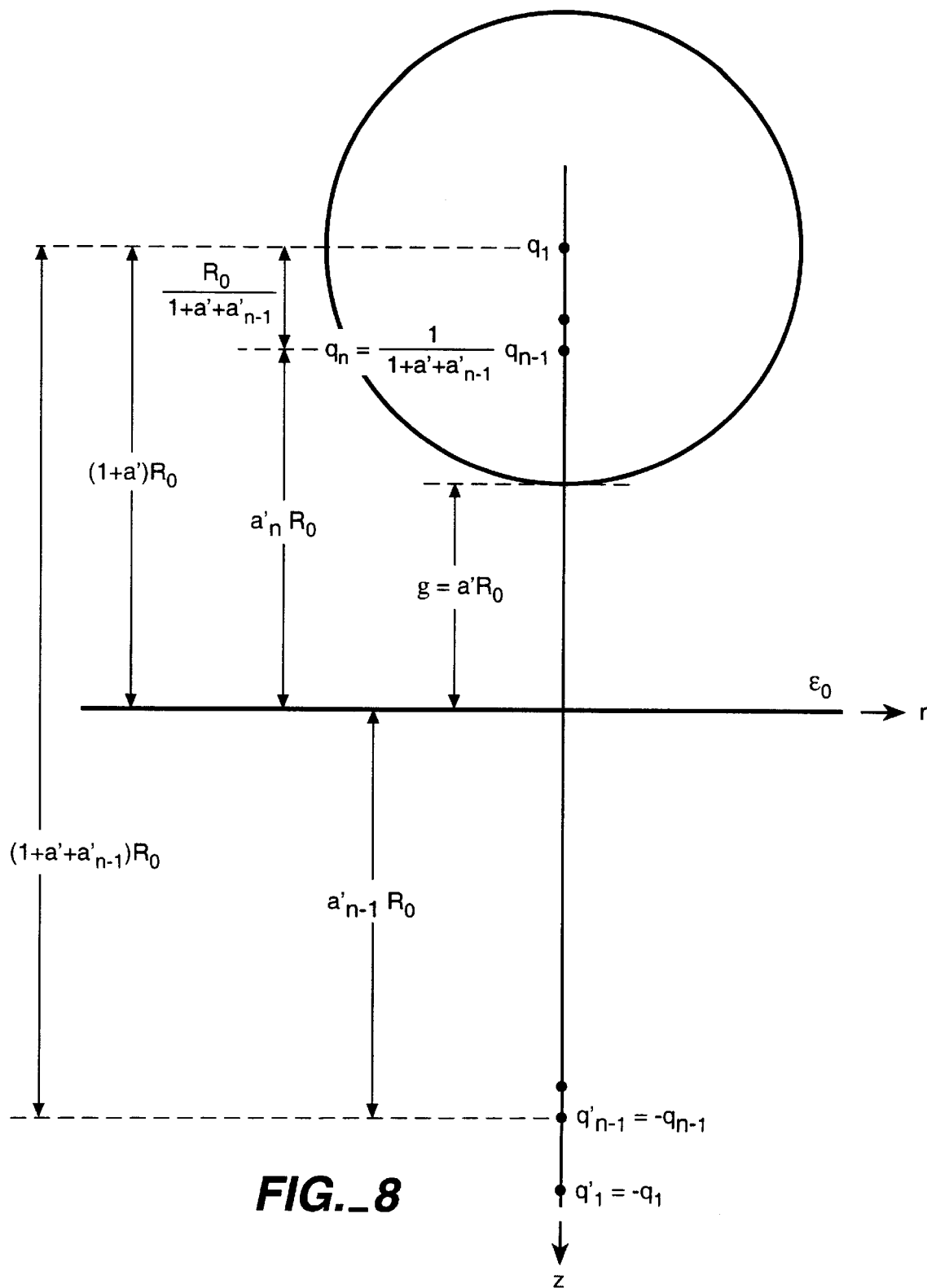
FIG._8

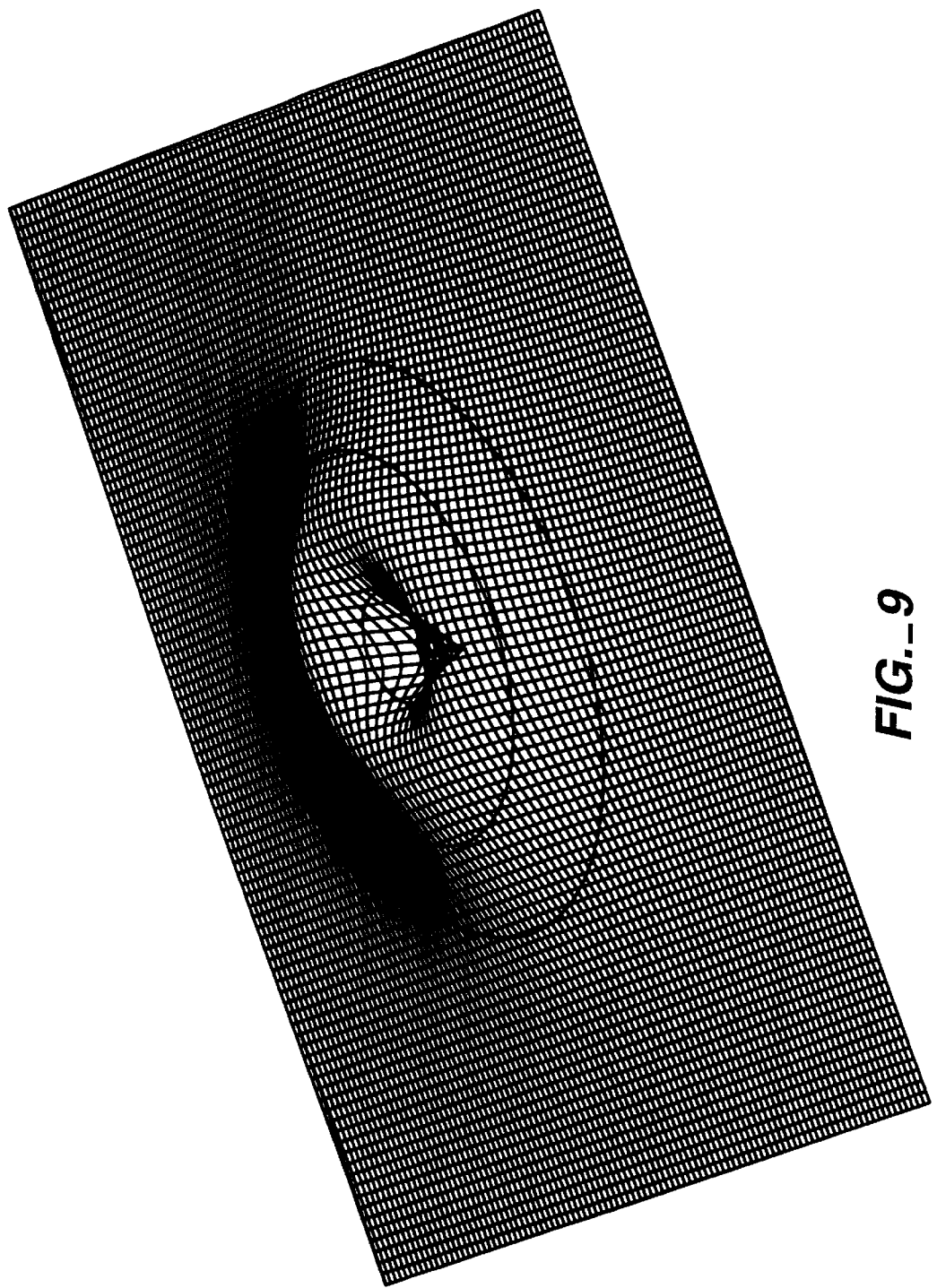
FIG._9

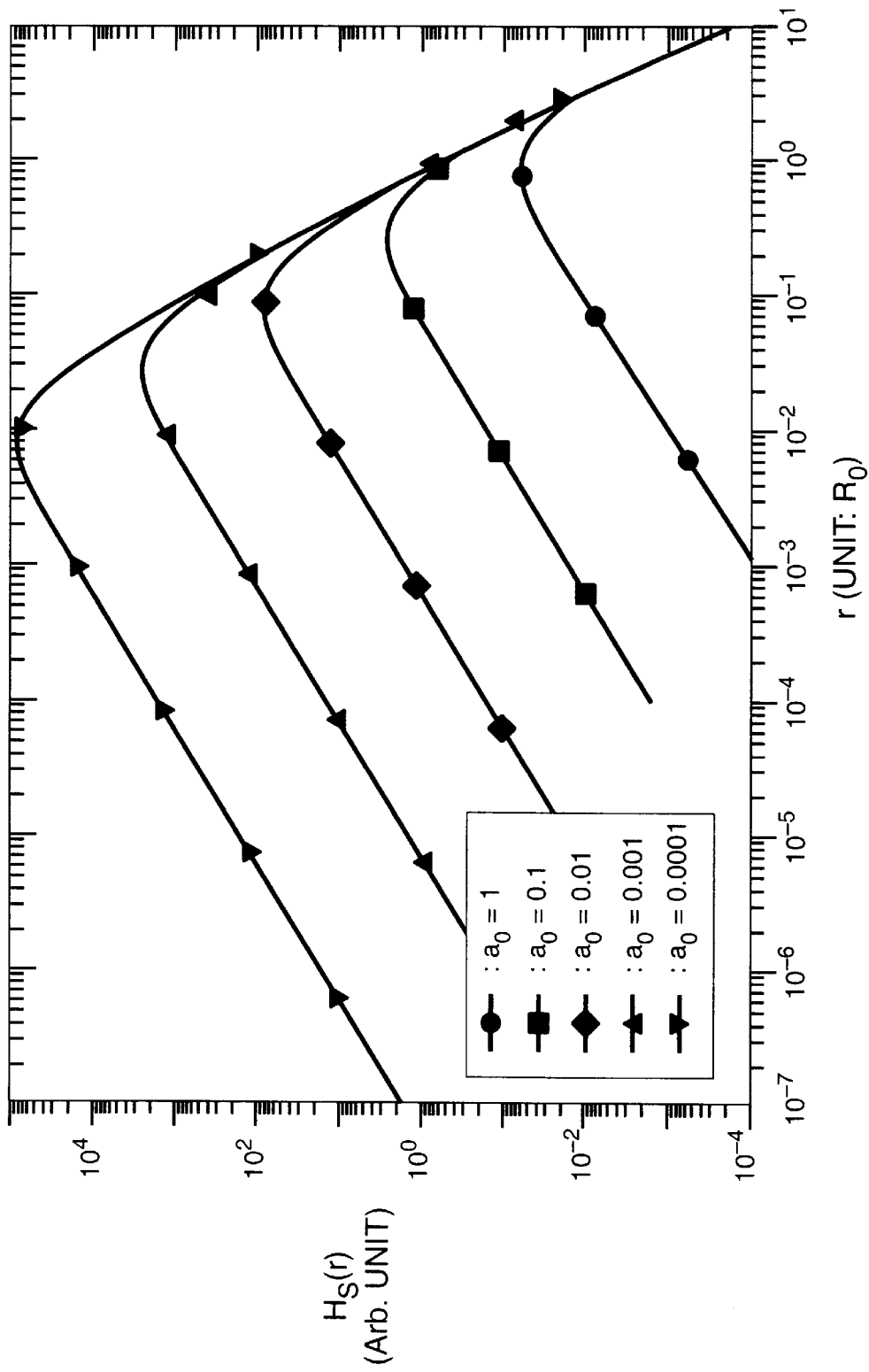
FIG._10

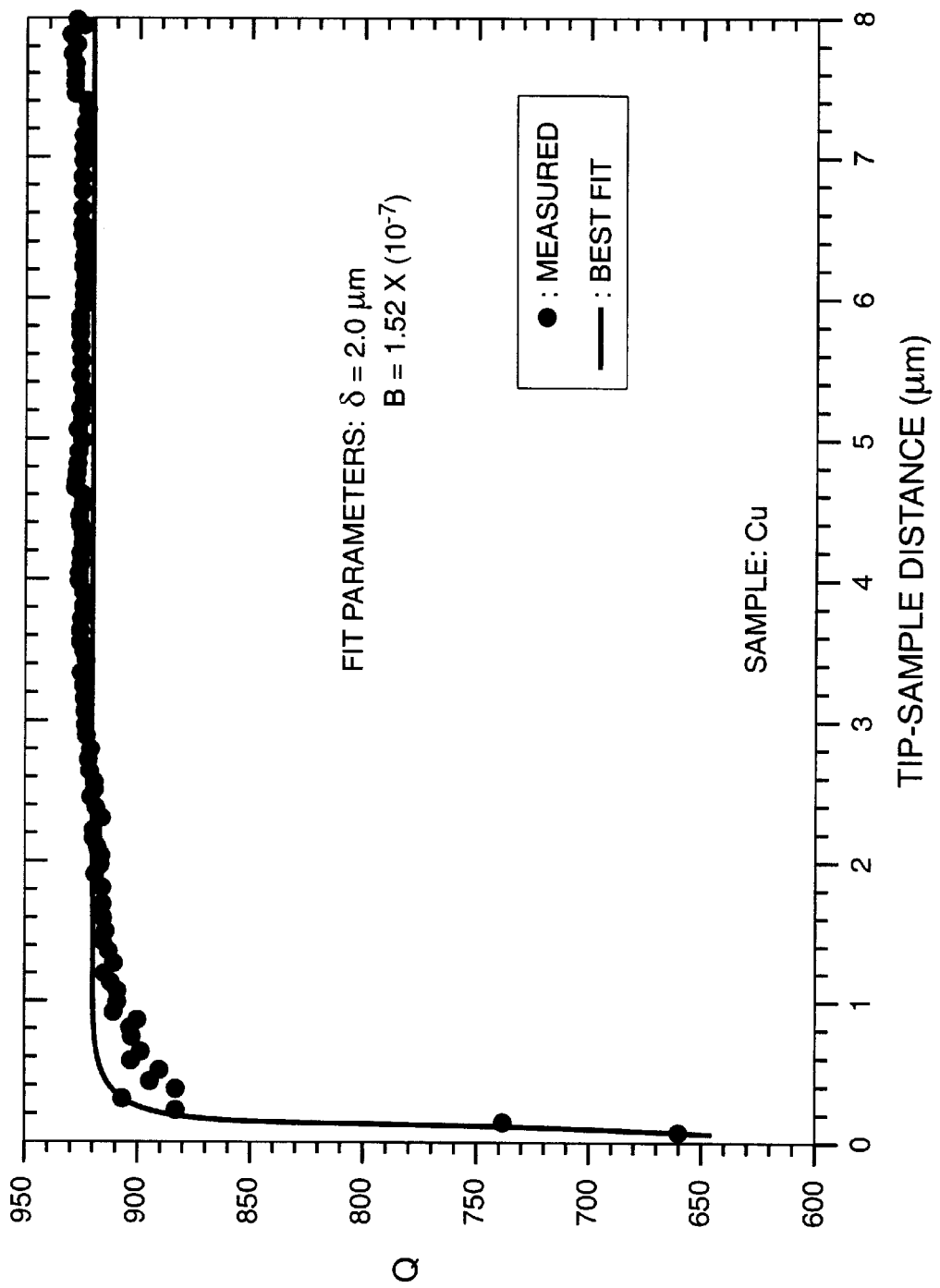
FIG._12

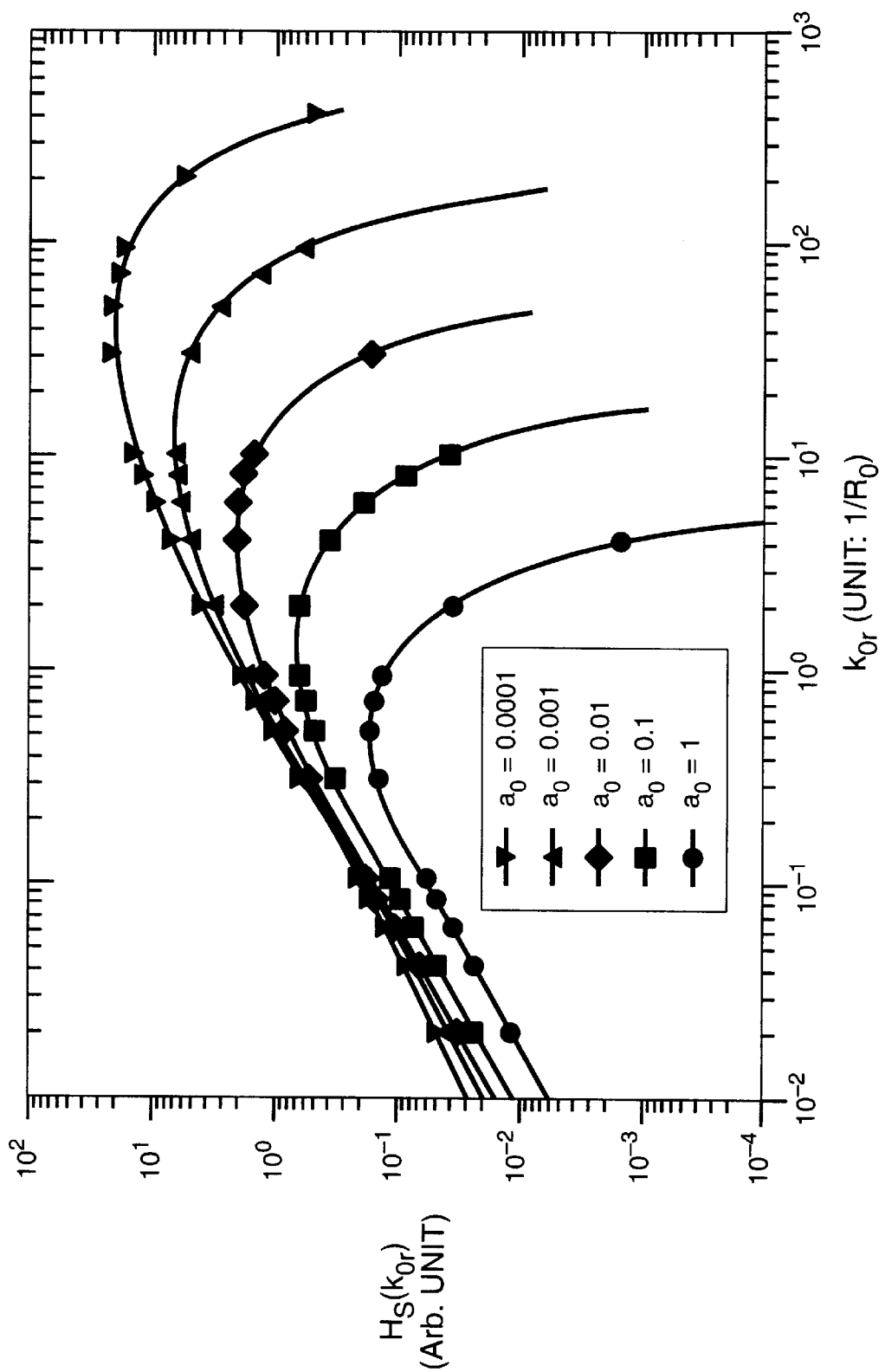
FIG._13

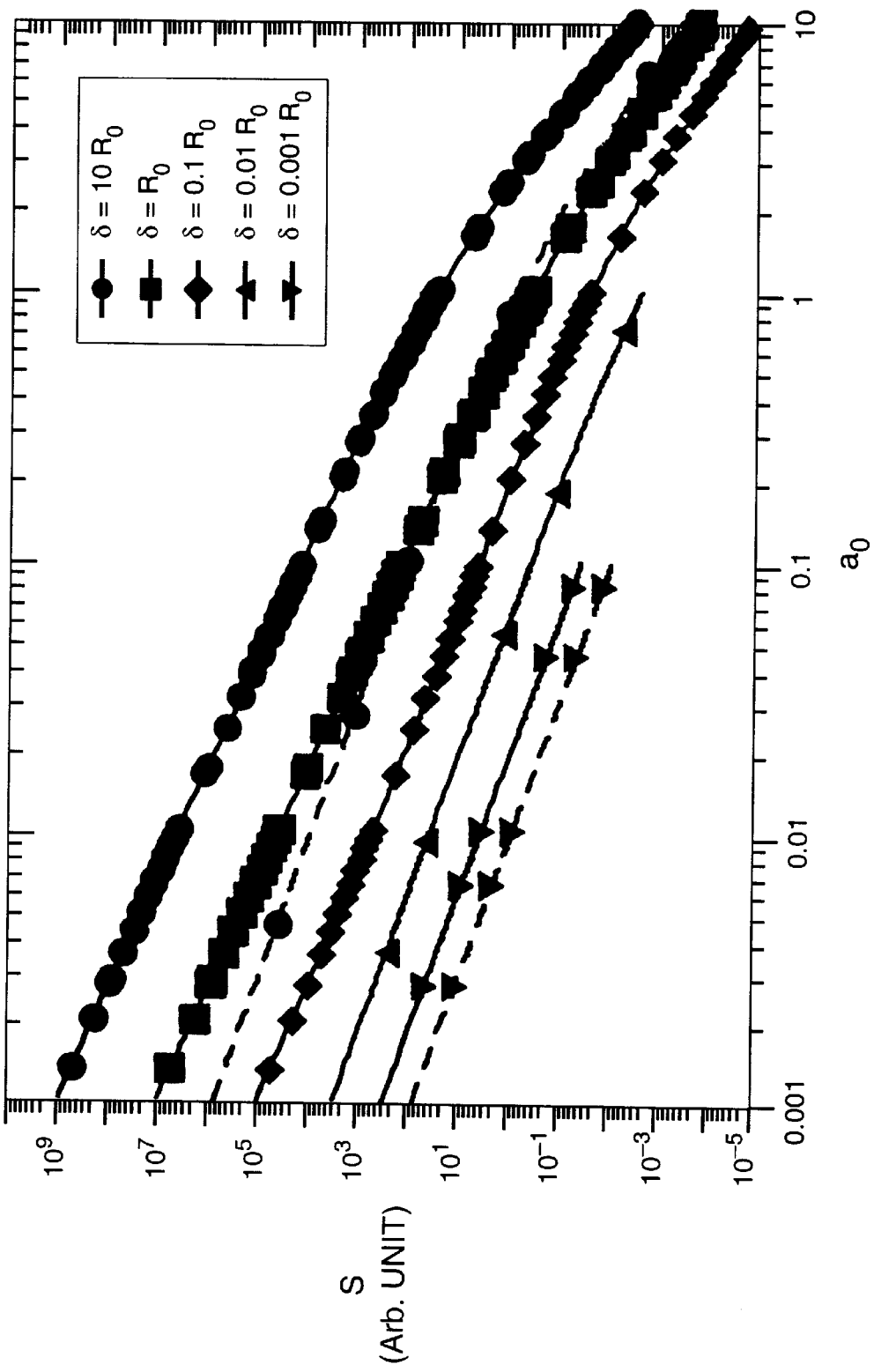
FIG._14

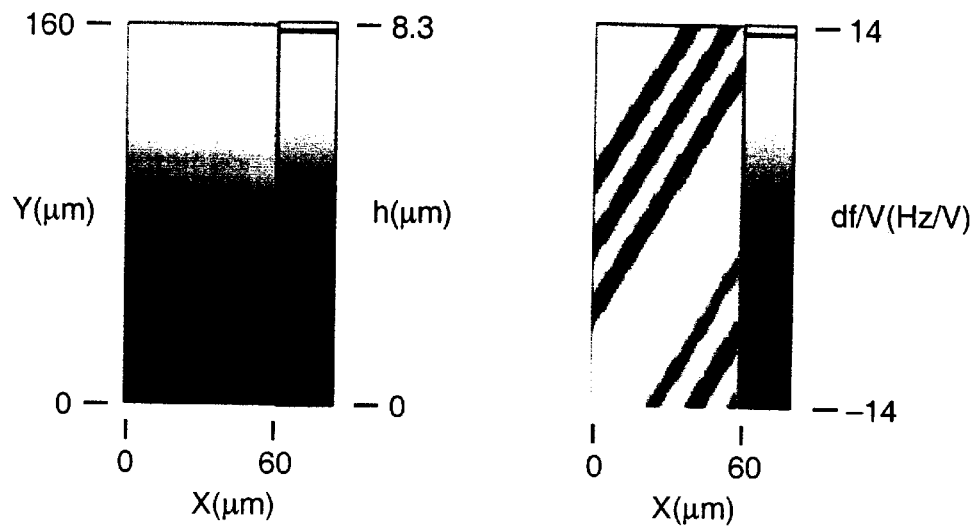
FIG._15
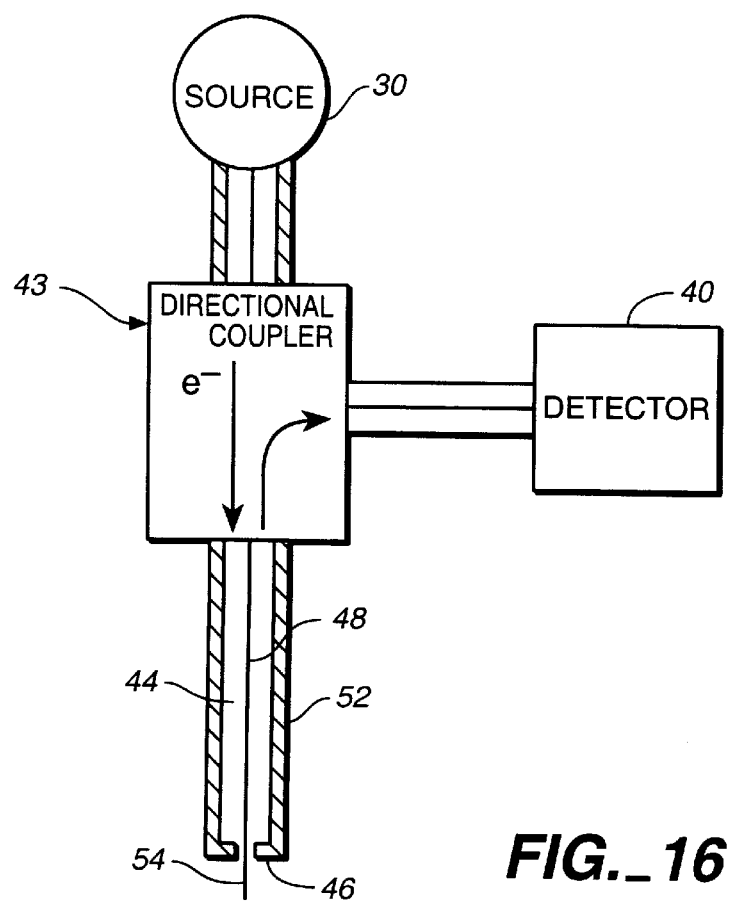
FIG._16

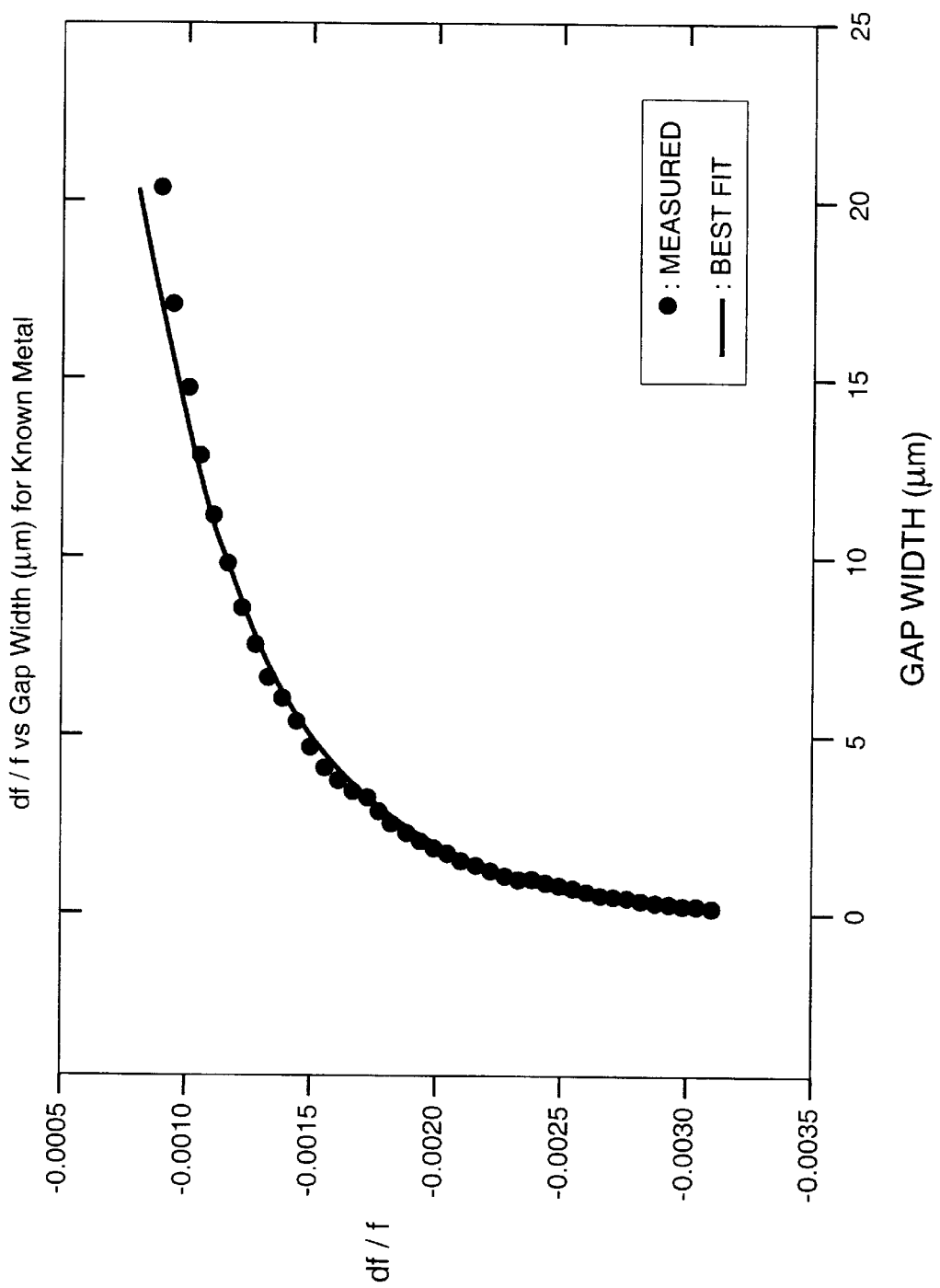
FIG._17

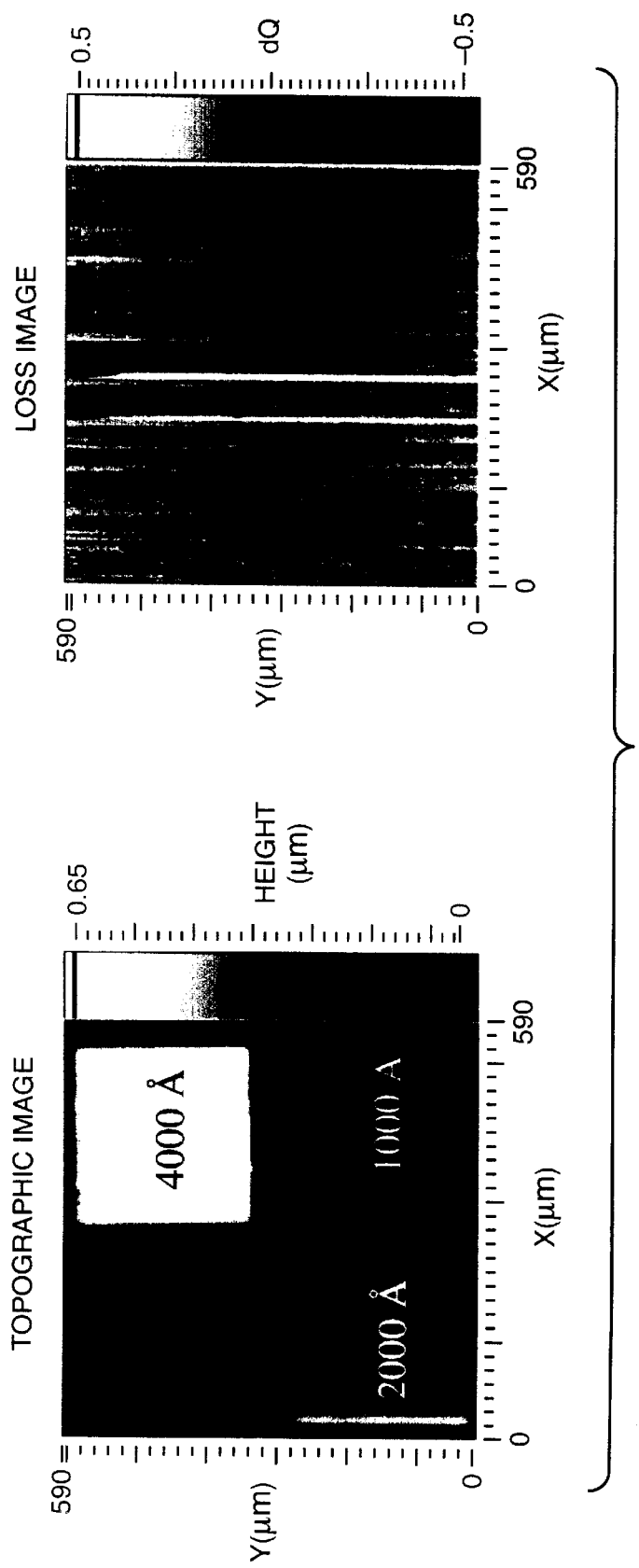
FIG._18

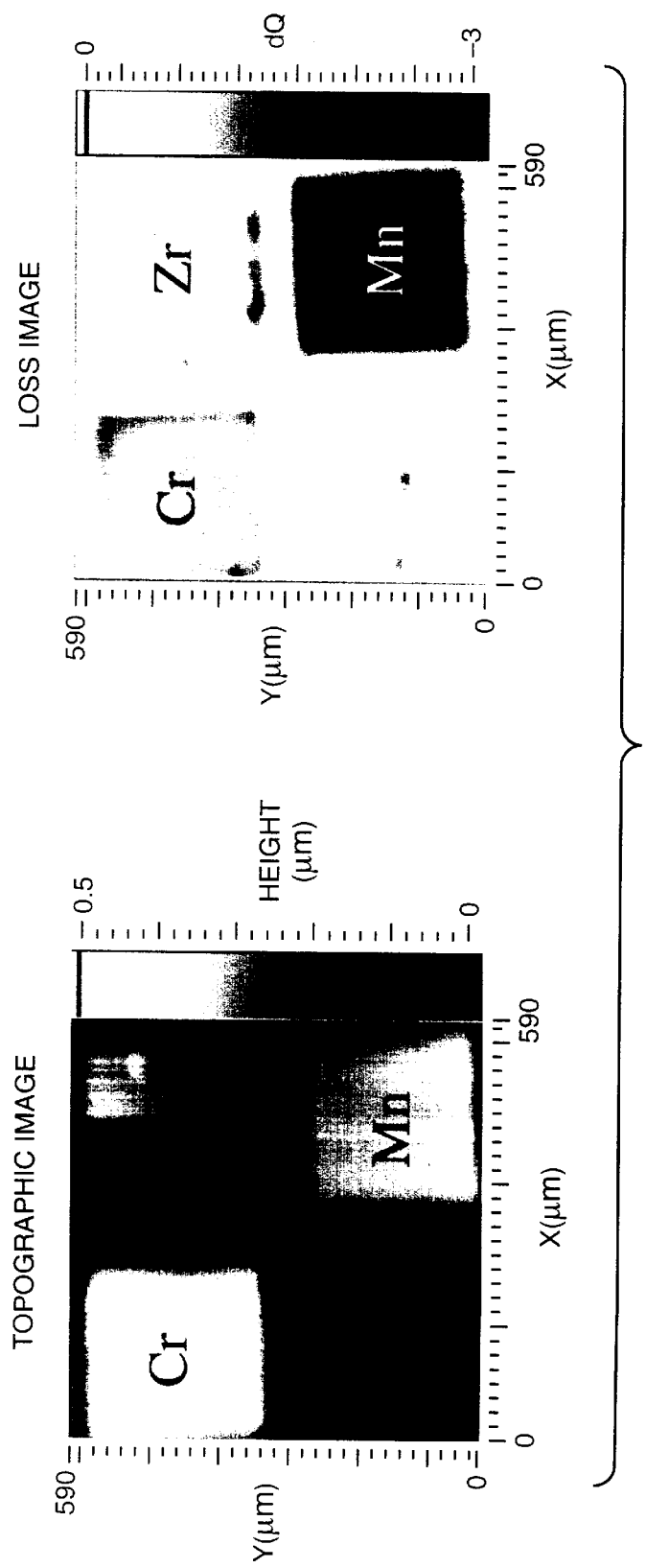
FIG._19

SCANNING EVANESCENT ELECTROMAGNETIC MICROSCOPE

This is a continuation-in-part of application Ser. No. 08/717,321, filed Sep. 20, 1996, now U.S. Pat. No. 5,821,410, and incorporated herein by reference. This invention claims benefit of provisional application Ser. No. 60/059,471 filed Sep. 22, 1997, and incorporated herein by reference.

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

BACKGROUND OF THE INVENTION

1. Field of the Invention

This invention relates generally to scanning probe microscopy and more specifically to scanning evanescent near field microwave and electromagnetic spectroscopy.

2. Description of the Related Art

Scanning probe type microscopes have typically been used to create visual images of a sample material. The image obtained may reflect any of a number of distinct electrical or magnetic properties of the sample material, depending on the parameter measured by the probe tip. For example, the tip may image electron tunneling, atomic force, absorption and refraction of propagating or evanescent electromagnetic waves, or other parameters. The tip may be in contact with the sample or it may be a short distance above the sample. A thorough discussion of scanning probe microscopes is presented by R. Wiesendanger, "Scanning Probe Microscopy and Spectroscopy: Methods and Applications" Cambridge University Press, 1994. Efforts in improving Scanning Probe Microscopes (SPMs) have focused almost entirely on increasing their resolution and sensitivity. While it is generally recognized that obtaining quantitative data to associate with the image detail would be highly desirable, two major technological barriers have prevented such instruments from being developed.

First, microscopy signals, as obtained from SPMs often are a combined function of topography and physical properties of the material. Separating them requires measuring at least two independent signals. For example, in scanning tunneling microscopy, the tunneling current is a function of both the tip to sample distance and the density of states. A recently developed scanning near-field optical microscope can measure optical signals such as luminescent spectra or optical index of refraction in addition to shear force, which can be used to determine the distance between tip and sample.

Second, to obtain quantitative information regarding the physical sample being imaged, complicated electromagnetic field equations in the region of the tip and sample must be solved. A review of this work is discussed by C. Girard and A. Dereux in Rep. Prog. Phys., vol. 657, 1996. Although numerical methods based on finite element analysis have been used to solve the field distribution around a near-field optical microscope tip, the complicated computational process involved, such as solving the Maxwell equations under real boundary conditions on a scale of a wavelength or less, is not practical in routine applications. The problem has been complicated for the work done in the past, because the microscopes were required to operate below a cut-off frequency and so suffered severely form waveguide decay, having a typical attenuation of $10^{-3}$ to $10^{-6}$ (R. F. Soohoo, J. Appl. Phys. 33:1276, 1962; E. A. Ash and G. Nichols, Nature, 237:510, 1972). In aperture or tapered waveguide probes, a linear improvement in resolution causes an exponential reduction in sensitivity. M. Fee, S. Chu, and T. W. Hansch, improved sensitivity and resolution to the micron level (Fee, M. et al., Optics Commun., 63:219, 1988) by using a transmission line probe with a reduced cross-section. However, further improvement in resolution was still accompanied by significant transmission line decay. The unshielded far-field wave propagation components around the tip of the transmission line probe significantly limited the resolution of the microscope, and particularly interfered with its use for quantitative analysis.

It would be highly desirable to have a scanning probe microscope capable of making images of features having submicron resolution and additionally capable of making quantitative measurements of the physical properties of the imaged features.

SUMMARY OF THE INVENTION

The invention comprises a near field scanning evanescent-wave microscope wherein a probe tip primarily emits an evanescent wave and wherein interfering propagating wave emissions are minimized. Propagating waves have low resolution while evanescent waves have high resolution. This feature is crucial for quantitative measurements, where only the near-field evanescent wave is modeled. A high resolution image is generated by scanning a sample with a novel evanescent wave probe on the inventive microscope. Furthermore, the inventive microscope provides complex electrical impedance values that are calculated from measured data and which are associated with the resolved image features. The complex impedance, including dielectric constant, loss tangent and conductivity can be measured for materials having properties that range from insulators to superconductors.

The inventive microscope is capable of quantitative measurements of dielectric properties and surface resistance with submicron resolution. By monitoring the resonance frequency ($f_r$) and quality factor (Q) of a resonant coaxial cavity coupled to the tip, the electrical properties of the sample are measured. One embodiment of the SEMM comprises a $\lambda/4$ coaxial resonator operating at frequency ($f_r$) of roughly 1 GHZ coupled to a sharp tip protruding from a narrow hole. When the probe tip is brought near a sample, $f_r$ and Q shift. The inventive microscope is capable of converting the measured $f_r$ and Q shifts to electrical parameters of the sample. Since the extremely small tip radius determines the extent of the field distribution, this microscope is capable of submicron resolution. For dielectric samples, the interaction between the probe tip and the sample is dependent on the dielectric constant and tangent loss of the nearby sample. For a metallic sample, the interaction depends on the surface resistance of the sample.

The probe itself, comprising either a resonator or a conventional coaxial body, is a key inventive feature of the microscope. An important novel feature of the probe tip is a conducting endwall having an aperture, through which the center conducting element of the coaxial cable or resonator extends without shorting to the endwall. Another key feature of the inventive microscope is the computing element programmed to convert measured changes in resonant frequency (or reflected electromagnetic wave) and measured changes in the quality factor to quantitative electrical parameters of the sample. An additional important feature of the inventive microscope is a means to maintain a constant separation distance between the tip and the sample while measurement scans of the sample are performed.

SUMMARY DESCRIPTION OF THE DRAWINGS

FIG. 1 is a diagrammatic view of the various components which comprise the imaging evanescent near field microscope system.

FIG. 2 is a diagrammatic view of the various components which comprise the quantitative evanescent near field microscope system.

FIG. 2A is an enlarged detail view along lines 2A—2A in FIG. 2.

FIG. 3 shows the image charge distribution for a thick sample in contact with the end of the probe tip. The $q_n$ series represents the charge redistribution on the tip; the $q_n'$ series represents the effect of polarization of the dielectric sample; and the $q_n''$ is the effective value of $q_n$ inside the sample.

FIG. 4 shows the image charge distribution for the configuration with an air gap between a thick sample and the end of the probe tip. Symbols $q_n$, $q_n'$, and $q_n''$ have the same meaning as in FIG. 3.

FIG. 5 shows a graph of measured and fitted resonant frequency as a function of the distance between the end of the probe tip and the sample for a MgO single crystal.

Figure 11:
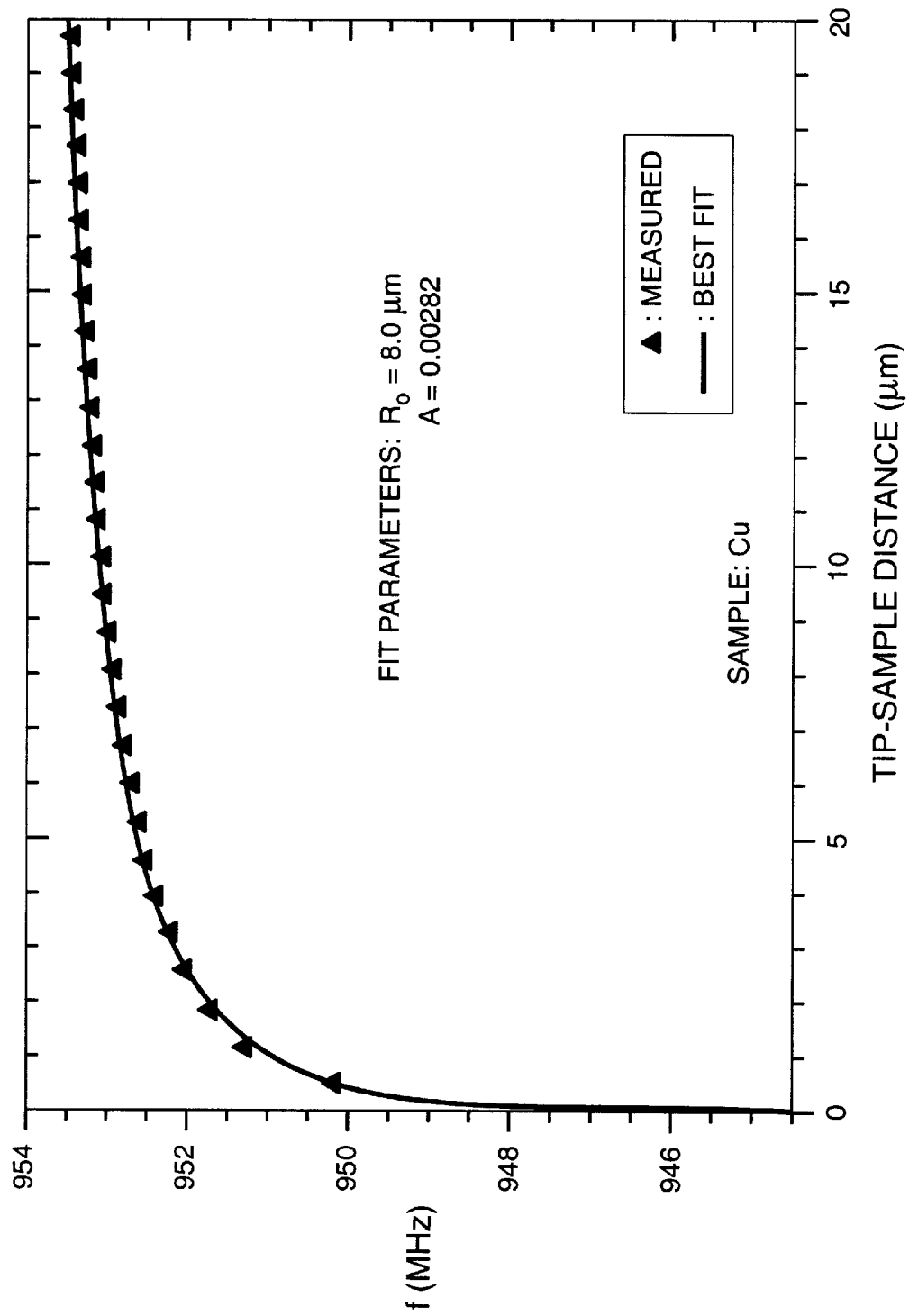

FIG. 6 shows distribution of image charges for a tip-sample configuration in which the sample comprises a thin film ($\epsilon_2$) on a thick substrate ($\epsilon_1$) and in which there is an air gap (g) between the probe tip and the film surfaces. Symbols $q_n$, $q_n'$, and $q_n''$ have the same meaning as in FIG. 3. The $q_n'$ series represents the effect of polarization of the dielectric film induced by the field of the tip. The $q_n''$ series represents the reaction on the film from the polarized substrate. The $q_n'''$ series represents the reaction on the tip form the polarized substrate, and the $q_n''''$ series represents the polarization of the dielectric film caused by $q_n'''$, etc. This analysis is analogous to a three-mirror system in optics.

FIG. 7 shows the intrinsic spatial resolution, in units of tip radius, $R_0$, of the SEMM as a function of dielectric constant.

FIG. 8 shows the multiple image charge analysis of tip-sample interaction between the end of the probe tip and a conducting sample.

FIG. 9 shows the magnetic field distribution on the surface of a conducting material surrounding the proximity of the probe tip.

FIG. 10 shows the radial distribution for the magnetic field on the surface of a conducting material surrounding the proximity of the probe tip, for different probe tip radii, $a_0$.

FIG. 11 shows measured data points (triangles) and a best fit calculated curve from SEMM signals as a function of gap size between the probe tip and a copper sample using the resonant frequency equation 12.

FIG. 12 shows measured data points (triangles) and a best fit calculated curve from SEMM signals as a function of gap size between the probe tip and a copper sample using the quality factor equation 19.

FIG. 13 shows the spatial frequency spectra of the magnetic field on the surface of a conducting material for five different values of $a_0$.

FIG. 14 shows the power dissipated, S, in a conducting sample as a function of $a_0$, the ratio of the gap distance to the radius of the probe tip.

FIG. 15 shows on the left, a topographic image of a LiNbO$_3$ sample having periodically poled domains. The image on the right is of a simultaneously obtained first harmonic image in which the contribution from sample-probe geometry has been excluded. These images were obtained using the inventive feed back control component to control sample to tip distance.

FIG. 16 shows an embodiment of the inventive probe tip comprising a coaxial cable instead of a resonator.

FIG. 17 shows a change in frequency as a function of gap distance for a known metal, the curve being useful as a calibration curve for the gap distance controller.

FIG. 18 shows results obtained using the SEMM to image conducting silver sections having differing heights but constant conductivity.

FIG. 19 shows results obtained using the SEMM to image conducting metal sections having differing heights and differing conductivity.

DETAILED DESCRIPTION OF THE INVENTION

The present invention is described in part in copending application Ser. No. 08/717,321, now U.S. Pat. No. 5,821, 410, and described in at least one embodiment by T. Wei and X.-D. Xiang in Appl. Phys. Lett., 68, 3506(1996). An image resolution of about 100 nm on dielectric material has been achieved with a sensitivity of about $10^{-3}$.

The present invention improves the visual image resolution of the scanning evanescent electromagnetic microscope and extends its utility to essentially simultaneous measurement of quantitative microscopy. The microscope is referred to as an SEMM, originally for Scanning Evanescent Microwave Microscope, and alternatives, because the microscope is not limited to the microwave region, for "Scanning Evanescent electroMagnetic Microscope". Using the SEMM, quantitative microscopy can be used to obtain the complex electrical impedance of dielectric, ferroelectric, and conducting materials with submicron resolution. Use of the SEMM is not limited to the microwave region. Rather the electromagnetic frequency of the inventive microscope is limited on the high end by the electron mobility in the sample being measured (that is the plasma frequency of the material) and on the low end by the practicality of the physical dimension of the resonant cavity portion of the probe tip. For a sample made from copper, frequencies ranging from the infrared region of the electromagnetic spectrum to the microwave region can be used on the scanning evanescent wave microscope. If the resonation is replaced by a coaxial cable having an end wall connected to the coaxial shielding element, the low end of the measurement frequency is essentially d.c.

To understand the invention, it is helpful to review some fundamental physics of evanescent-wave microscopy. The evanescent-waves in this context refer to electromagnetic waves with wave-vectors of imaginary number not originating from dissipation. In fact, the evanescent electromagnetic waves are the photon equivalent of quantum mechanic electron waves in the classically forbidden region (within a barrier). In the far-field description of electromagnetic waves, an orthogonal eigenfunction set of Hilbert space is chosen as the plane waves whose wave vectors are any real number satisfying Helmholtz equation (as a consequence, these plane waves are propagating waves). Any propagating wave (for example, a propagating spherical wave from a point source) can be expanded as the superposition of these plane waves. The magnitudes of the wave vectors are solely determined by the frequency and speed according to Maxwell equation, i.e. $k=2\pi(\epsilon\mu/c)^{1/2}=2\pi/\lambda=(k_x^2+k_y^2+k_z^2)^{1/2}$. For propagating waves, $k_x$, $k_y$, and $k_z$ are real numbers and thus must be smaller than k (in free space $k=k_0$). These waves only have resolving power on the order of λ. However, these plane waves can not be used to reconstruct, for example, a spherical wave whose wave front has a radius less than the wavelength λ. Therefore, a true complete set of Hilbert space should include plane waves whose wave-vectors are any complex number satisfying the Maxwell equation to construct such a spherical wave. Since imaginary wave vectors are allowed, the components ($k_x$, $k_y$, and $k_z$) can then be any value and still satisfy the Maxwell equation. Here the "plane waves" whose lateral components $k_r=(k_x^2+k_y^2)^{1/2}$ larger than k will have higher lateral resolving power (on the order of $1/k_r$). However, since they must have imaginary components $k_z$ to satisfy the Maxwell equation, these waves are "evanescent" and can not propagate much more than a wavelength (λ). Different methods of evanescent-wave microscopy use different means to obtain strong evanescent waves and strong interaction between the evanescent wave and the substance under inspection. For example, a metal sphere or tip fed by a wave source with a radius of r (<<λ) will generate evanescent waves (to form a spherical wave on the metal surface satisfying the boundary conditions) whose wave vectors range up to $k_r \sim 1/r$ and resolving power up to ~r. Interaction between the tip and sample (with high effective dielectric constant) may further increase the high $k_r$ components and resolution as a result of decreasing the effective tip radius from a polarizing effect. Since these waves decay over a distance (r) in free space, the sample has to be brought to within r of the tip to obtain strong interaction. Note, these waves are not necessarily evanescent in conducting materials since $k_c=2\pi/\lambda_c$ in conducting materials is many orders of magnitude larger than that in free space.

The inventive scanning evanescent microscope uses an evanescent wave to image the surface with high resolution and to obtain a quantitative measurement of the complex electrical impedance associated with detail resolved in the image. The inventive apparatus uses the near-field interaction between the evanescent waves around the tip and the samples under scan.

FIG. 1 shows the inventive near field microscope system utilizing the novel evanescent probe structure comprising a microwave resonator such as illustrated microwave cavity 10 having generator 30 electrically connected to cavity 10 to feed an input signal, through a coaxial line 32, into a coupled loop input 12 on cavity 10. A coupled loop output 14 of cavity 10 is connected to a detector 40 through a second coaxial line 42. Detector 40, in turn, feeds the output signal to a data acquisition unit 50. The data from data acquisition unit 50 is then fed into a computer 60 which converts the data into an image viewable at image display 70 connected to computer 60. Other means besides coupled loops or tuned loops can be used to couple energy to and from the resonant cavity, as described in detail in the text "Microwave Engineering" by D. M. Pozar, (Addison-Wesley Publishing Co, New York, 1990).

The Structure of the Tip

One of the best prior art probe tips comprised an open-ended coaxial cable which included a center conducting wire surrounded by an insulator and enclosed in an external shield. This type of tip generates both a near-field evanescent wave, which doesn't propagate more than a few wavelengths (λ) before it attenuates and thus results in high resolution measurements, and a far-field propagating wave. The propagating wave is undesirable because it interferes with the near-field evanescent wave. In order to minimize the propagating wave, researchers attempted to use coaxial cables having smaller and smaller diameters, but eventually large energy loss and difficult physical construction to avoid electrical breakdown between the shield and center wire became a problem. Because of the practical limitation in diameter of the conventional coaxial cable design, the present inventors developed a configuration in which the center wire was sharpened and extended a distance beyond the shielding, or a sharpened tip was mechanically and electrically connected to the center wire. An additional inventive shielding element was added to the bottom edge of the coaxial cable in order to minimize any electromagnetic fields created between the sharpened end of the probe and the end of the external shielding, which when left open can allow far-field propagating wave to reach the sample and dominate the near-field evanescent wave. In addition, the present inventors added a resonator which was located immediately above or near the probe tip so that evanescent waves could be generated and sensed with greater efficiency and sensitivity, although the resonator is not a necessary component for every application.

The inventive SEMM tip limits the creation of propagating waves so that high resolution evanescent wave measurements can be made effectively. One feature of the inventive tip that limits creation of far-field propagating waves is a conductive shielding element that extends over the portion of the coaxial cable that otherwise would have been open. Referring to FIGS. 1, 2 and 2A at the end from which the probe tip 20 extends, a new electrically conducting shielding element 16 is located so that its outer edge connects to the exterior coaxial shield 17 and its inner edge circles, or surrounds, the probe tip without electrically shorting to it. The conducting shielding element 17 is preferably thin, on the order of 1 μm, to avoid causing excess loss. It is preferably physically supported by a low loss insulator like sapphire. In essence, the outer shield 17 is brought around the end portion 16 of the insulator but has an opening, or aperture 22 through which the probe can extend without electrically shorting to the shield. The aperture is conveniently circular but does not have to be circular. The aperture is smaller than either the coaxial cable or a resonator that is used to generate the evanescent wave. Conveniently, the end portion of the insulator forms a plane that is approximately normal to the line of the probe portion, however a tapered surface could span part of the distance between the outer shield and probe as long as the sensitivity of the probe remains acceptable and degradation of the Q factor is avoided. The Q factor is a quality factor; it equals the ratio of the total energy in the resonator and the energy that is dissipated from the resonator ($Q=E_{total}/E_{dissipated}$). The Q factor is a function of the geometry of the cavity and tapering the walls of the cavity may lower it (as well as lowering the sensitivity) unacceptably for any given desired measurement. Preferably, $Q=2\pi E_{total}/E_{dissipated}$.

As shown in both FIGS. 1, 2 and 2A a sharpened metal tip 20 which, in accordance with the invention acts as a point-like evanescent field emitter as well as a detector, extends through a cylindrical opening or aperture 22 in endwall 16 of cavity 10, as will be described in more detail below. Mounted immediately adjacent sharpened tip 20 is a sample 80. Sample 80 is mounted to a movable target mount or stepper mechanism 90 which can be moved in either the X, or Y, or Z axis by an X-Y-Z scanning control 100 which, in turn, is controlled by signals from computer 60.

Microwave generator 30, detector 40, image diode detector 34, amplifier, phase shifter, A/D converter, data acquisition unit 50, computer 60, display 70, movable target mount 90, and X-Y-Z scanning control 100 all comprise commercially available equipment. For example, microwave generator 30 is available from the Programmed Test Source Company as model PTS1000, detector 40 is available from Pasternack Enterprises as model PE800-50, data acquisition unit 50 is available from National Instruments as model PC-TIO02150, computer 60 may comprise any standard programmable computer, display 70 may comprise any commercially available monitor, and movable target mount or stepper mechanism 90 is available from the Ealing Company as model 61-0303. Design principles for a quarter wave cavity, such as cavity 10, may be found in "Radio Engineer Handbook" by F. E. Terman.

Cavity 10 comprises a standard quarter or half wave cylindrical microwave cavity resonator having a central metal conductor 18 with a tapered end 19 to which is attached sharpened metal tip or probe 20. An optional spacer, made of an insulation material such as TEFLON, may be used to assist in maintaining the central positional of central conductor 18 coaxially within cavity 10. As shown, probe tip 20 extends through and beyond aperture 22 formed in endwall 16.

Metal Probe Tip Thickness

Metal probe tip 20 has a sharpened end thereon which may be as fine as about 100 Angstroms in diameter The sharpened end of tip 20 will usually vary in diameter from as small as about 100 Angstrom 10 nm) to as large as about 100 $\mu$m, and preferably ranges from about 200 Angstroms (20 nm) to about 20 $\mu$m. Sharpened metal probe tip 20 may be formed, for example, by electrochemically etching one section of a wire which might have an initial diameter of from about 1 $\mu$m to about 0.2 millimeters (mm) prior to the electrochemical etch. Sharpened metal probe tip 20 may be connected to tapered end 19 of central conductor 18 by welding or any other suitable means which will provide a secure mechanical and electrical connection between tip 20 and tapered probe end 19.

The Diameter of the Aperture

Experimentally, the minimum diameter of aperture 22 has been determined to be the minimum diameter which maintains the high Q and sensitivity of the resonator. The aperture opening must be small enough that a propagating wave is not emitted that will interfere with the evanescent wave measurement. To maintain the high Q, the minimum diameter of aperture 22 should be greater than the thickness of endwall 16. That is, endwall thickness (t) divided by aperture diameter (d) must be much less than unity (t/d<<1) to maintain high Q (or low loss) of the resonator. Ideally, the endwall should be made by plating a good conducting film (silver or copper) of about 1–2 $\mu$m thick on a low loss insulating plate (~1 mm thick), such as sapphire or $_{LaAlO3}$ to reduce the thickness (t) while maintaining rigidity (mechanical vibration is not desired). The aperture diameter is also related to the diameter of the metal probe tip which passes through and beyond aperture 22. The minimum aperture diameter, therefore, will usually be at least about 200 Angstroms (20 nm). If the diameter of aperture 22 is too large, however, the resolution will be reduced. It has been found, however, that the diameter of aperture 22 may be as large as 3 mm while still maintaining satisfactory resolution. Typically, the diameter of aperture 22 will range from about 500 Angstroms (50 nm) to about 1 mm.

Extension of Metal Tip through and Beyond Aperture

As shown in both FIGS. 1, 2 and 2A sharpened metal probe tip 20 extends through and beyond cylindrical aperture 22 in endwall 16 of resonator 10. The reason why probe tip 20 must extend beyond aperture 22 a distance comparable to the diameter of aperture 22, in accordance with the invention, is to reduce the effect of the size of the aperture on the resolution. That is, the reason probe tip 20 extends through and beyond aperture 22, instead of terminating at aperture 22, as in prior art structure, is to provide increased spatial resolution, dependent dimensionally on the radius of probe tip 20 rather than the diameter of aperture 22. The extension of probe tip 20 beyond aperture 22 also is helpful and convenient for the scanning of the sample. The length of the portion of sharpened metal probe tip 20 which extends through and beyond aperture 22 is related to the diameter of aperture 22. This length of probe tip 20 extending through and beyond aperture 22 will range from about ⅓ of the diameter of aperture 22 to about three times the diameter of aperture 22. The preferred ratio of extension length to aperture diameter has been found to be about one. The extension length should be further selected to be the length that does not give rise to a large background signal (caused by radiation from the aperture which interacts with the sample) while still giving rise to a strong signal by the tip-sample interaction.

The Resonator

Still referring to the embodiment of FIGS. 1, 2 and 2A cavity 10, including shielding 32 and endwall 16, is formed of metal but preferably comprises a diamagnetic material such as copper or silver, rather than a ferromagnetic material, so that a modulating magnetic field can be used in connection with cavity 10. The diameter (or diameters if the size varies) of cavity 10 will determine the Q factor of the cavity, while the length of cavity 10 will equal the wavelength (at the resonant frequency) divided by four, i.e. cavity length=$\lambda/4$ (a quarter wavelength cavity). Usually, the cavity diameter should be large enough and the diameter ratio of cavity 10 to central electrode 18 should be about 3.6 to provide an optimum Q. The Q of a microwave cavity or resonator may be defined as the quality factor of the cavity, and should be kept as high as possible. The sensitivity of the near field microscope can be improved by increasing the input microwave power and unloaded Q, denoted $Q_u$, of the resonator with an optimal coupling which is achieved by adjusting the coupling strength so that the loaded Q, denoted $Q_l$, is 2/3 of $Q_u$.

The resonator cavity volume is filled with a dielectric material, preferably one having low loss. The resonant wavelength is directly proportional to the square root of relative dielectric constant that fills the cavity, that is, $\lambda = \epsilon^{1/2} \lambda_0$. The relative dielectric constant is proportional to the dielectric constant of a vacuum. Thus, using a dielectric having a large $\epsilon$, decreases the resonant frequency of the cavity or decreases the size of cavity needed for a give resonant range. Sample dielectric materials that can be advantageously used to fill the resonator cavity include air, strontium titanate ($SrTiO_3$), and sapphire ($Al_2O_3$).

The resonator height is in integral multiples of $\lambda/4$, that is n $\lambda/4$ where n is an integer. If the resonator is an open resonator, n is an even integer; if the resonator is closed, n is an odd integer.

Use of a Coaxial Cable Instead of a Resonator

The resonator can be replaced with a standard coaxial cable. FIG. 16 shows an embodiment of the inventive probe tip using a conventional coaxial cable in place of a resonator. An electromagnetic energy source 30 delivers electromagnetic energy to the cable. The coaxial cable has an outer electric shielding element 52 that surrounds an insulator element 44 and a central conducting element 48. The central conducting element extends beyond the end of the coaxial cable and is either sharpened into a tip or a fine sharp tip is attached to it. At the end of the coaxial portion of the cable, a thin metal endwall 46 is attached to the insulator that is interposed between the shielding 52 and the center conductor 48. The endwall thickness is guided by the same consideration as for the conductive endwall 16 at the end of the resonator. The endwall 46, located at the end of the coaxial cable, has an orifice of sufficient size to allow the center cable 48 to pass through it without electrically shorting the center probe to the endwall.

The inventive probe comprising a coaxial cable, additionally has a directional coupler 43 located between the endwall 46 and the source 30. The directional coupler 42 couples the source electromagnetic wave to the cable. The electromagnetic wave propagates down the cable to the end and is reflected back by the end wall. Interaction between the probe tip 54 and the sample being scanned modifies the properties of the reflected wave. The reflected wave is coupled to a detector 40 by directional coupler 43 and the amplitude and phase of the reflected wave are measured by the detector. Quantitative values of the physical properties of the sample, such as complex conductivity, dielectric constant, tangent loss, conductivity, and other electrical parameters are determined using equations programmed into the SEMM.

Quantitative Measurement of the Complex Electrical Impedance of a Dielectric or Ferromagnetic Using the inventive SEMM with a shielded probe tip with resonator that minimizes or eliminates far-field wave components, dielectric materials have been imaged having a spatial resolution of 100 nm and sensitivity of $1 \times 10^{-3}$. Furthermore, using a computation of an analytic expression of the field distribution around the probe tip, a quantitative measurement was taken of the complex electrical impedance dielectric material. Thus, a map of electrical impedance values was constructed that matched resolution and sensitivity of the image, and wherein the measured complex electrical impedance values were correlated to features visualized on the image.

Referring again to FIGS. 2 and 2A, in one embodiment, the coaxial resonator has a height of $\lambda/4$. A sapphire disk 21 with a center hole only slightly larger than that of the tip wire was located in the end plate. The tip diameter was between about 50 $\mu$m and about 100 $\mu$m. A metal layer of about 1 $\mu$m was coated on the outside surface of the sapphire disk to shield the tip from far-field propagating components. The metal coating thickness is determined by the skin-depth to avoid the formation of a micro-transmission line, which would have heavy loss near the aperture. In one embodiment, the sapphire disk serves to minimize vibration and is bonded to the probe tip using insulating glue. In addition, insulating glue having low energy loss may be used to fix the tip wire with respect to the endwall shielding so that the tip does not vibrate against the shielding.

In a different embodiment, the entire resonant cavity is filled with a dielectric material such as $SrTiO_3$. In that case, the height of the resonant cavity is greatly reduced as the resonant wavelength is inversely proportional to the square root of the relative dielectric constant of the material that fills the cavity. Considering that $\lambda=(c/f)\epsilon^{-\frac{1}{2}}$, for f=1 GHZ and $\epsilon$=300, for $SrTiO_3$, $\lambda$ is about 1.73 cm, and $\lambda/4$, the height of the resonator, is only about 0.43 cm. The resonant diameter may shrink significantly also.

As explained in copending application Ser. No. 08/717,321, now U.S. Pat. No. 5,821,410, an image is obtained by placing the tip of the resonator in direct physical contact with the sample to be imaged, and scanning the tip across the surface of the sample. The resonator is driven at a frequency that is slightly higher or lower than the resonant frequency of the resonator. The change in the resonant frequency is then measure by recording the output power at the input frequency (measured as the detector output voltage). As the tip scans the sample, the resonant frequency of the resonator is reduced as a function of the relative conductivity of different regions of the sample. Thus, for example very fine niobium wires coated on, say, silicon dioxide, can be successfully imaged to a spatial resolution of about 5 $\mu$m (about $\lambda/100,000$).

In the present invention, in addition to detecting relative differences in conductivity of the surface of the sample, a quantitative measurement is obtained of the complex electrical impedance. This is possible because the resonant frequency, $f_r$, and the quality factor, Q, shifts as functions of the dielectric constant and loss tangent of any material, such as the sample material, located near the probe tip. In the past, this functional relationship was not well enough known, however, to obtain quantitative information about the dielectric constant, loss tangent, or complex electrical impedance, from a measured shifts in $f_r$ or Q.

The present invention comprises a scanning evanescent wave resonant-probe microscope having a computing element capable of correctly relating a series of measured shifts in $f_r$ and Q to the complex electrical impedance, (e.g. dielectric constant, loss tangent, or conductivity) at a series of locations on the sample surface. The computing element is programmed to calculate values of $\epsilon$ and tangent losses (tan $\delta$) at a series of different frequencies.

The calculations are made from a mathematical model that is thoroughly described in a paper entitled, "Quantitative Microwave Near-Field Microscopy of Dielectric Properties", submitted by the inventors to Review of Scientific Instruments, accepted for publication, and incorporated herein by reference.

Using the inventive microscope, the probe tip is placed either in direct soft contact with the sample, or a small gap is preserved between the probe tip and the sample. There are several steps to making measurements of a dielectric sample, described in detail below. In summary, one method of measuring a dielectric constant and loss tangent of a sample comprises, a) determining a reference resonant frequency $f_0$ of the probe by
   i) locating the probe far enough away from the sample material that it is not influenced by the sample;
   ii) sweeping a frequency range;
   iii) plotting frequency versus power;
   iv) fitting a curve to find the maximum frequency, called $f_0$;

b) determining $Q_0$ by dividing $f_0$ by a frequency difference at two half power amplitude points;

c) calculating the coefficient M from the equation $S=MQ_0^2$ where S is the power at $f_0$;

d) calibrating the geometric factors A, B, and $R_0$, in equations 5 and 6 using a sample of known dielectric constant;

e) placing a probe tip of a scanning evanescent electromagnetic wave microscope near or in soft contact with the sample;

f) measuring the shift in resonant frequency caused by the proximity of the sample near the probe tip;

g) measuring the quality factor shifts caused by the proximity of the sample near the probe tip; and h) calculating the dielectric constant and loss tangent using a pair of equations chosen from the group comprising soft contact equations 2 and 3, probe-sample gap equations 5 and 6, or the Thin Film equations.

Alternatively, the frequency versus power curve in the procedure above can be determined using a Lorentz line type fit to obtain $f_0$, and $Q_0$.

Soft Contact Measurements of Dielectrics

When using evanescent waves and a tip radius that is much smaller than the probe wavelength, the electromagnetic wave can be treated as quasi-static, that is, the wave nature of the field can be ignored. In addition, the sample material in the vicinity of the small probe tip is reasonably considered as homogeneous and isotropic in its dielectric properties.

Thus $\epsilon=\epsilon'+j\epsilon''$ where $\epsilon$ is $>>\epsilon_0$, and $\epsilon'>>\epsilon''$, where $\epsilon$ is the complex dielectric constant, $\epsilon'$ is the real component of the dielectric constant, $\epsilon''$ is imaginary component of the dielectric constant, and $\epsilon_0$ is the dielectric constant of free space.

Furthermore, $\mu=\mu'+j\mu''$ and $\mu\sim\mu_0$; where $\mu$ is the complex magnetic permeability of the sample; $\mu'$ is the real component of the magnetic permeability, and $\mu''$ is the imaginary component of the magnetic permeability, and $\mu_0$ is the magnetic permeability of free space.

FIG. 3 shows a diagram of the measurement geometry. The probe tip 20 is in soft contact with the surface of a dielectric material 80 having a thickness much larger than the tip radius. For example, the sample thickness may be more than two times as thick as the tip radius. More preferably it is five times as thick. To the first order, the probe tip is represented as a charged conducting sphere under the same potential as the end point or tip of the center conductor in the endwall of the resonator, since the tip only extends out a length several orders of magnitude smaller than the wavelength beyond the cavity. The dielectric sample under the tip is polarized by the electric field of the tip and thus acts electrically on the tip causing a redistribution of charges on the tip to maintain the equipotential surface of the conducting sphere. The action on the tip is represented by an image charge ($q_1'$) located in the sample; the redistribution of charge in the probe tip is represented by another image charge ($q_2$) inside the spherically modeled tip end. This action and redistribution repeats itself, that is, it is iterative until equilibrium is attained. Three series of image point charges are formed that meet the boundary conditions at both tip and dielectric sample surfaces as shown in FIG. 3. The peak value of the field distribution inside the sample can be expressed as a superposition of contributions from the series of point charges ($q_n''$) the effective value of $q_n$ in the sample. The expression for the field distribution is, $$\vec{E}_1 = \frac{q}{2\pi(\varepsilon+\varepsilon_0)}\sum_{n=1}^{\infty}\frac{1}{n}b^{n-1}\frac{r\vec{e}_r+(z+R_0/n)\vec{e}_z}{[r^2+(z+R_0/n)^2]^{3/2}} \quad (1)$$

where $b=(\epsilon-\epsilon_0)/(\epsilon+\epsilon_0)$, $q=4\pi\epsilon_0 R_0 V_0$; $R_0$ is the radius of the tip, and $e_r$ and $e_z$ are the unit vectors along the directions of the cylindrical coordinates r and z, respectively. This field distribution satisfies Coulomb's law and the boundary conditions on the surfaces of both the dielectric sample and the conducting sphere terminus of the probe tip. In this model, the majority of the electromagnetic energy is concentrated in the cavity and the field distribution inside the cavity is not disturbed by any tip-sample interaction. Therefore, perturbation theory for electromagnetic resonators, where the frequency is perturbed slightly to find the resonant frequency or the amplitude of the energy deposited in the cavity is perturbed, can be used to calculate the $f_r$ and Q shifts that would result from a particular dielectric material, as noted in equations (2) and (3).

$$\frac{\Delta f_r}{f_r} = -\frac{\int_v (\Delta\varepsilon\vec{E}_1 \cdot \vec{E}_0 + \Delta\mu\vec{H}_1 \cdot \vec{H}_0) dv}{\int_v (\varepsilon_0 \cdot E_0^2 + \mu_0 H_0^2) dv} = A\left[\frac{\ln(1-b)}{b}+1\right] \quad (2)$$

$$\Delta\left(\frac{1}{Q}\right)_d = \frac{\int_v (\Delta\varepsilon''\vec{E}_1 \cdot \vec{E}_0 + \Delta\mu''\vec{H}_1 \cdot \vec{H}_0) dv}{\int_v (\varepsilon_0 E_0^2 + \mu_0 H_0^2) dv} = -\frac{\Delta f_r}{f_r}\tan\delta \quad (3)$$

where $E_0$, $H_0$, and $E_1$, $H_1$, refer to the electric and magnetic field before and after the perturbation, respectively, $\lambda$ is the wavelength, $A=4\pi \epsilon_0 R_0 (V_0^2/E_{total})$ is a constant determined by the geometry of the tip-resonator assembly ($A\sim16$ $R_0$ $\ln(R_2/R_1)/\lambda$ for an ideal $\lambda/4$ coaxial resonator), and tan $\partial=\epsilon'/\epsilon$. $V_0$ is the voltage on the probe tip.

Considering first the shift in resonant frequency, equation (2) shows that the shift in resonant frequency is proportional to the radius ($R_0$) of the probe tip. This is because the electric field near a conducting sphere, which is how the probe tip is modeled, at a given voltage is inversely proportional to the sphere radius and the total contribution to the signal is the integration of the square of the electrical field magnitude divided by the volume of the sample.

Considering now the shift in quality facto (Q), the extra current required to support a charge redistribution on the spherical probe tip end when it is brought near a dielectric induces resistivity loss. This results in a shift in Q that is expressed as, $$\Delta\left(\frac{1}{Q}\right)_c = -B\frac{\Delta f_r}{f_r} \text{ and the total } Q \text{ shift is} \quad (4)$$

and the total Q shift is (4)

$$\Delta\left(\frac{1}{Q}\right)_t = -(B+\tan\delta)\frac{\Delta f_r}{f_r}$$

The tan $\partial$ is referred to as the loss tangent.

Using equations 2, 3, and 4, quantitative measurements of the local complex dielectric constant for samples having a thickness much greater than the probe tip radius can be made. The sample thickness may be at least about two times as thick as the probe tip radius. Preferably, the sample thickness is at least five times as thick as the probe tip radius. Even more preferably the sample thickness is at least ten times greater than the probe tip radius. The constants A and B are found by calibration against a standard sample such as sapphire that has a known dielectric constant and loss tangent. Table I lists relative dielectric constants ($\epsilon_r$) and loss tangents for a number of materials measured using the inventive SEMM. The relative dielectric constants are relative to measurements taken in a vacuum or air. The measurements were calibrated against a sapphire single crystal ($\epsilon_r=11.6$ and tan $\partial=2\times10^{-5}\sim0$ at 10 GHZ). These values for sapphire and the reported values on the table were obtained from T. Konaka, et al., J. Supercond. 4:283(1991). The measured values agree extremely well with the literature values, which differ functionally in that they are measured as averages over large volumes).

TABLE I

Measured Dielectric Constants and Tangent Losses for Single Crystals

| Material | Measured $\epsilon_r$ | Reported $\epsilon_r$ | Measured tg$\delta$ | Reported tg$\delta$ |
|---|---|---|---|---|
| YSZ | 30.0 | 29 | $1.7 \times 10^{-3}$ | $1.75 \times 10^{-3}$ |
| LaGaO$_3$ | 23.2 | 25 | $1.5 \times 10^{-3}$ | $1.80 \times 10^{-3}$ |
| CaNdAlO$_4$ | 18.2 | 19.5 | $1.5 \times 10^{-3}$ | $0.4$–$2.5 \times 10^{-3}$ |
| TiO$_2$ | 86.8 | 85 | $3.9 \times 10^{-3}$ | $4 \times 10^{-3}$ |
| BaTiO$_3$ | 295 | 300 | 0.47 | 0.47 |
| YAlO$_3$ | 16.8 | 16 | — | 8.2 |
| SrLaAlO$_4$ | 18.9 | 20 | | |
| LaAlO$_3$ | 25.7 | 24 | | $2.1 \times 10^{-5}$ |
| MgO | 9.5 | 9.8 | | $1.6 \times 10^{-5}$ |
| LiNbO$_3$(X-cut) | 32.0 | 30 | | |

Air-Gap Measurements of Dielectrics

It is sometimes preferable not to have the probe tip in direct contact with the sample. In this case, iterative relationships are derived for the image charges as shown in FIG. 4.

$$a'_n = 1 + a' - \frac{1}{1 + a' + a'_{n-1}}$$

$$q_n = t_n q$$

$$t_n = \frac{b}{1 + a' + a'_{n-1}} t_{n-1}$$

where a'=g/R$_0$ and g is the gap distance between the sample and the probe tip. The initial conditions of the iterations are $a_1'=1+a'=1+g/R_0$ and $t_1=1$. Using a perturbation method similar to the one described above, $$\frac{\Delta f_r}{f_r} = -A \sum_{n=1}^{\infty} \frac{bt_n}{a'_1 + a'_n} \quad (5)$$

$$\Delta\left(\frac{1}{Q}\right)_t = -(B + \tan\delta)\frac{\Delta f_r}{f_r} \quad (6)$$

FIG. 5 shows the measured resonant frequency (f$_r$) as a function of the gap distance for a Magnesium Oxide (MgO) single crystal (data points are shown as triangles). The best fitted curve using modeling equation 5 is also shown. For MgO, $\epsilon_r$=9.5, R$_0$=12.7 $\mu$m, and A=1.71×10$^{-3}$. The excellent agreement between the measurement and the mathematical model used in the present inventive microscope indicates that the quasi-static and spherical tip approximations support accurate measurements.

It is important to estimate the effect of the air gap relative to measurements made using the soft contact measurement. For the soft contact measurement, a', which equals g/R$_0$, approaches zero. For the air gap measurements, $$a'_n \to \frac{1}{n} + \frac{2n^2 + 1}{3n} a' \quad (7)$$

and $$t_n \to \frac{b^{n-1}}{n}\left(1 - \frac{n^2}{3}a'\right)$$

then, $$\frac{\Delta f_r}{f_r} \to -A \sum_{n=1}^{\infty} \frac{b^n}{n+1}\left[1 - \frac{(n+1)^2}{3}a'\right] \approx \left(\frac{\Delta f_r}{f_r}\right)_0 + Aa'\frac{b(2-b)}{3(1-b)^2}$$

where $(\Delta f_r/f_r)_0$ refers to the frequency shift when the tip comes in soft contact with the samples which can be evaluated from equation 2. Equation 7, shows that even if the tip to sample distance is maintained within 1 nm (for example a'~$10^{-2}$ for an 100 nm probe tip radius), the effect of such an air gap cannot be neglected because the second term of equation 6 has a relatively small denominator (1−b~2$\epsilon_0$/$\epsilon$). For an $\epsilon_r$=10, the difference is about 10% and increases rapidly to 50% for $\epsilon_r$=35.

Thin Film Measurements

One application of the inventive SEMM is measuring the dielectric constant of thin films. In this respect it is important to understand that many films traditionally considered thin films would interact with the inventive probe as a bulk sample because of the extreme sharpness with which the probe tip can be made. The penetration depth of the field is calculated using equation 1 to be about the same as the radius of the probe tip, R$_0$.

In the case where the film thickness is on the order of R$_0$ or smaller, the image charge model discussed above is not useful because of divergence of the image charges, as illustrated in FIG. 6. Typically, numerical methods such as finite element analysis are necessary for such thin films. However, modeling the contribution of the substrate to the reaction on the tip, provides a good approximation using the image charge approach. Clearly the contribution from the substrate decreases as the film thickness and dielectric constant increases. This contribution was modeled by replacing the effect of reaction from the complicated image charges with an 'effective charge' using the following equations:

$$b_{\text{eff}} = b_{20} + (b_{10} - b_{20})\exp\left[-0.18\frac{a}{(1-b_{20})}\right]$$

where $b_{20}=(\epsilon_2-\epsilon_0)/(\epsilon_2+\epsilon_0)$, $b_{10}=(\epsilon_1-\epsilon_0)/(\epsilon_1+\epsilon_0)$, and $\epsilon_2$ and $\epsilon_1$ are the dielectric constants of the film and substrate, respectively; a=d/R$_0$ and d is the thickness of the film. In choosing this formalism both infinitely thin and infinitely thick film limitations are accounted for. The constant, 0.18, was determined through a series of calibrations and its value can be further refined. The present invention is not limited to this particular value in the equation. Using a similar process as described above yields:

$$\frac{\Delta f_r}{f_r} = -A\sum_{n=1}^{\infty}\sum_{m=0}^{\infty} b_{\text{eff}}^{n-1} b_{20}^n b_{21}^m \left[\frac{b_{20}}{n+1+2mna} - \frac{b_{21}}{n+1+2(m+1)na}\right]$$

$$\Delta\left(\frac{1}{Q}\right)_t =$$

-continued $$A\left\{\tan\delta_2 \sum_{n=1}^{\infty}\sum_{m=0}^{\infty} b_{\text{eff}}^{n-1} b_{20}^m b_{21}^m \left[\frac{1}{n+1+2mna} - \frac{1}{n+1+2(m+1)na}\right] + \frac{2\varepsilon_2\varepsilon_1\tan\delta_1}{(\varepsilon_2+\varepsilon_1)(\varepsilon_2+\varepsilon_0)} \sum_{n=1}^{\infty}\sum_{m=0}^{\infty} \frac{b_{\text{eff}}^{n-1} b_{20}^m b_{21}^m}{n+1+2(m+1)na}\right\} = B\left(\frac{\Delta f_r}{f}\right)$$

where $b_{21}=(\varepsilon_2-\varepsilon_1)/(\varepsilon_2+\varepsilon_1)$, $\tan\delta_2$ and $\tan\delta_1$ are the tangent losses of the film and substrate.

The above two equations can be referred to as the Thin Film Equations.

Table II shows the results of measuring dielectric constants for thin films using the inventive SEMM and a conventional inter-digital contact electrode at 1 GHZ.

TABLE II

Measured dielectric constants and tangent losses of various thin films By SEMM and interdigital electrode technique, both measured at 1 GHZ.

| Films | SEMM measurement | | Interdigital electrodes | |
|---|---|---|---|---|
| | $\varepsilon_p$ | $\tan\delta$ | $\varepsilon_p$ | $\tan\delta$ |
| SrTiO$_3$ | 292 | 0.01 | 297 | 0.01 |
| Ba$_{0.5}$Sr$_{0.5}$TiO$_3$ | 888 | 0.19 | 868 | 0.10 |
| Ba$_{0.7}$Sr$_{0.3}$TiO$_3$ | 707 | 0.14 | 727 | 0.07 |

Intrinsic Spatial Resolution

Intrinsic spatial resolution is an important figure of merit for microscopes. The intrinsic resolution of the inventive microscope was estimated using equation 2 to calculate numerically the contribution to ($\Delta f_r/f_r$) from small vertical columns as a function of lateral location (r) relative to the center of the tip for materials of different dielectric constants. The contribution was shown to decrease quickly as r increased, especially when $\varepsilon$ was large. The radius where the contribution from the volume inside the radius r reached 50% of the total contribution was defined as the intrinsic spatial resolution. In that case, the estimated resolution was about two orders of magnitude smaller than the tip radius at the moderate Er (~50) and decreased slightly as $\varepsilon_r$ increased. This is illustrated in FIG. 7. This behavior can be understood by considering that the effective probing charge on the probe tip is attracted downwards to the sample by the polarized dielectric sample. The higher the dielectric constant is, the shorter the effective distance is between the charge and sample. As a result, the field distribution inside the sample is concentrated in a very small region just below the tip apex with the polarization perpendicular to the sample surface, and $f_r$ and Q shifts are dominated by the contribution from this small region. Experiments on dielectric materials having moderate dielectric constants have shown that 100 nm resolution can be achieved with a tip radius of several microns. The figure of merit of a near-field microscope is the ratio of the wavelength inside the sample and the spatial resolution. For the present embodiment)a figure of merit of about 4×10$^5$ was calculated as follows and verified by measurement.

$\lambda_0=c/f=30$ cm.

$\lambda=\lambda_0\varepsilon^{-½}=\lambda_0/50^{-½}=30$ cm/7.1=4.2 cm

The spatial resolution was 100 mm so the Figure of Merit is, $\lambda/100$ mm=4.2 cm/ 10$^{-5}$cm=4.2×10$^5$.

Because the electromagnetic wavelength in metals is several (at least four) orders of magnitude smaller than that in free space, samples of electrically conducting materials are not suitable for this resolution analysis.

Sensitivity Analysis

The resonant system can be analyzed using an equivalent lumped series resonant circuit with effective capacitance C, inductance L and resistance R (for an ideal quarter-wave resonator):

$$C = \frac{2\pi\varepsilon_0}{\ln(R_2/R_1)}l$$

$$L = \frac{\mu_0}{2\pi}l\ln(R_2/R_1)$$

$$R = \frac{2R_s}{\pi^3}\left(\frac{1}{R_2}+\frac{1}{R_1}\right)l$$

where $l=\lambda/4$ is the effective cavity length, $R_s$ is the surface resistance of cavity material, $R_2$ and $R_1$ are the radii of center and outer conductors, respectively; $\varepsilon_0$ and $\mu_0$ the permittivity and permeability of free space, respectively. The uncoupled ($Q_u$) and are the permittivity and permeability of free space, respectively. The uncoupled ($Q_u$) and coupled ($Q_c$) quality factors of the resonant system are given by:

$$Q_u = \frac{1}{\omega_r CR}$$

$$Q_c = \frac{1}{\omega_r C}\frac{1}{R+R_0/p^2}$$

where $R_0$ is the internal resistance of the source, $\omega_r=2\pi f_r=1/\sqrt{LC}$ and $f_r$ is the resonant frequency, and p (h/l)·cos θ is the coupling factor (h is the equivalent coupling length and θ is the angle between the coupling loops and the radius direction). The power delivered by the source, $P_0$, the power delivered into the cavity, P, and energy stored in the cavity, E, are expressed as:

$$P_0 = \frac{1}{2}\left(\frac{V}{p}\right)^2 \frac{1}{R+R_0/p^2}$$

$$P = \frac{1}{2}\left(\frac{V}{p}\right)^2 \frac{R}{(R+R_0/p^2)^2}$$

$$E = \frac{P_0 Q_c}{\omega_r} = \frac{PQ_u}{\omega_r} = \frac{1}{2}\left(\frac{V}{p}\right)^2 CQ_c^2 = \frac{1}{4}CV_0^2 = \frac{\pi\varepsilon_0\lambda}{8\ln(R_2/R_1)}V_0^2$$

where $V_0$ is the open end peak voltage. As the signal S detected by the diode detector is proportional to the square of the voltage in coupling loop:

$$S=M Q_c^2 \tag{7A}$$

at the resonant frequency, where M is a constant that is determined by measuring Q from the frequency response of a known material.

At the same time, the output signal of the phase detector can be expressed as:

$$V \propto \frac{1}{\sqrt{2}}V_0 z + V_n$$

where $z=2Q_c(\omega_0-\omega_r)/\omega_r$, $\omega_0$ is the circular frequency of the source, $V_n$ is the noise voltage. Then, the output power caused by $\delta\omega=(\omega_0-\omega_r)$ is:

$$P \propto P_s + P_n = 4PQ_c^2\left(\frac{\delta\omega}{\omega_r}\right)^2 + P_n$$

To estimate the Johnson noise limited sensitivity, consider a matched lossy network at physical temperature T. The energy flows are equal in thermal equilibrium:

$$k_BTB/N+P_n=k_BTB$$

where $N=Q_u/(Q_u-Q_c)$ is the insertion loss, $k_B$ is Bolzmann's constant, and B is the bandwidth of the data acquisition. Finally, the noise power is:

$$P_n = k_B TB \frac{Q_c}{Q_u}$$

The Johnson noise limited sensitivity is then determined by $P_s=P_n$:

$$\frac{\delta\varepsilon}{\varepsilon} = \frac{1}{A}\sqrt{\frac{k_BTB}{4PQ_cQ_u}}$$

As $PQ_c$ takes its maximum value a $$Q_C = \frac{2}{3}Q$$

(the best working condition which can be achieved by adjusting the angle of coupling loop θ), the minimum detectable (δε/ε) is estimated to be:

$$\left(\frac{\delta\varepsilon}{\varepsilon}\right)_{min} = \frac{1}{8\pi R_0 V_0 f_r}\sqrt{\frac{3k_BTBc}{2\varepsilon_0 Q_u \ln(R_2/R_1)}}$$

where c is the speed of light in free space. Suppose the vacuum breakdown voltage between the shielding coating and tip wire is $V_0=10$ V (for a gap of 10 mm between the tip wire and shielding coating), the estimated sensitivity is about $1\times 10^{-5}$ for $R_0=1$ μm, $f_r=1$ GHZ, T=300 K, B=100 kHz, $Q_u=1700$, and $R_2/R_1=5$. To obtain such sensitivity, a microwave source with frequency stability of $df/f=1\times 10^{-8}$ is required. Sensitivity is limited to $1\times 10^{-3}$ by the stability of the analog voltage controlled oscillator (VCO)($10^{-6}$) used in the system. The equation above shows that the sensitivity increases linearly with tip radius, $R_0$. As the resolution decreases linearly with tip radius shown in the above text, the conflict between resolution and sensitivity has reached the best possible compromise from a physical point of view.

Quantitative Measurement of the Conductivity of an Electrically Conducting Sample The classical skin-depth concept of conducting materials (still often used in evanescent wave microscopy) can be shown as no longer valid in describing the interaction between evanescent electromagnetic waves and conducting materials. The classical skin-depth concept is derived from the interaction between a conducting surface and propagating plane waves whose k vector components ($k_r$, $k_z$) must be smaller than $k_0$. As $k_c \gg k_0$, there is little difference between refracted waves inside the conducting materials for different $k_z$ and the overall physical parameters can be calculated with a single valued $k_r=k_0$. On the other hand, the value of the k vector components ($k_r$, $k_z$) for the evanescent plane waves involved in interaction between the evanescent wave and the sample are multi-valued and can be much higher than $k_0$. The overall physical parameter has to be calculated for each different k vector component value and integrated. The inventors present here a calculation of detailed field configuration and evanescent electromagnetic wave interaction with conducting materials. It should enable a wide range of scientific applications in quantitative evanescent electromagnetic waves microscopy. In principal, the results are applicable to evanescent wave microscopy of frequencies up to the far infrared, as long as the wavelength is much larger than the dimension of the interaction region. In addition, since the electric field configuration considered here is identical to the electrostatic field configuration in various scanning probe microscopes, it should also enable a wide range of quantitative microscopy using scanning probe microscopes.

The inventive SEMM is based on a high quality factor (Q) microwave coaxial resonator with a sharpened metal tip mounted on the center conductor. The tip extends beyond an aperture formed on a thin metal shielding end-wall of the resonator. The tip and the shielding structure are designed so that the propagating far-field components are shielded within the cavity whereas the non-propagating evanescent waves are generated at the tip. This feature is crucial for both high resolution and quantitative analysis. Because it is not mathematically feasible to model the interactions of both evanescent and propagating waves, (where the latter are leaked from the resonator), quantitative microscopy would not be possible without the inventive microscope configuration. In contrast to conventional antenna probes (a far-field concept), the inventive probe does not emit significant energy (and therefore provides a very high Q to boost the sensitivity). Only when the tip is close to the sample will the evanescent waves on the tip interact with the material. The interaction gives rise to a frequency and Q change of the cavity and consequently the microscopy of the electrical impedance.

In brief, measurements of the conductivity of electrically conducting samples comprises the following steps:

a) determining a reference resonant frequency $f_0$ of the probe by
   i) locating the probe far enough away from the sample material that it is not influenced by the sample;
   ii) sweeping a frequency range;
   iii) plotting frequency versus power and;
   iv) fitting a curve to find the maximum frequency, called $f_0$;

b) determining $Q_0$ by dividing $f_0$ by a frequency difference at two half power amplitude points;

c) calculating the coefficient M from the equation $S=MQ_0^2$ where S is the power at $f_0$;

d) placing a probe tip of a scanning evanescent electromagnetic wave microscope near the sample;

e) calibrating the geometric factors A, B, and $R_0$, in equations 12 and 19 by measuring and fitting the frequency and quality factors as a function of a gap distance, g, between the probe tip and a reference sample of known conductivity;

f) measuring the shift in resonant frequency caused by the proximity of the sample near the probe tip;

g) calculating g from equation 12;

h) measuring the shift in quality factor caused by the proximity of the sample near the probe tip; and i) calculating the conductivity using equation 19.

When a conducting material is placed in the vicinity of the tip (modeled as a sphere), it will interact with the tip causing charge and field redistribution. The first order field redistribution can be obtained by treating the material as an ideal conductor with infinite conductivity. Under the quasi-static approximation (the wavelength is much larger than the effective region of field distribution), the surface of the conducting material is a charge mirror and the tip-sample interaction can be represented as a multiple image charge process as shown in FIG. 8. The electric field in the tip-sample region can be calculated as the superposition of contributions from all the charges:

$$\vec{E} = \frac{1}{4\pi\epsilon_0} \sum_{n=1}^{\infty} q_n \left\{ \frac{r\vec{e}_r + (z + a_n R_0)\vec{e}_z}{[r^2 + (z + a_n R_0)^2]^{3/2}} - \frac{r\vec{e}_r + (z - a_n R_0)\vec{e}_z}{[r^2 + (z - a_n R_0)^2]^{3/2}} \right\} \quad (8)$$

and the electromagnetic fields on the surface of the conducting material are:

$$\vec{E}_s(r) = \frac{R_0}{2\pi\epsilon_0} \sum_{n=1}^{\infty} \frac{a_n q_n}{[r^2 + (a_n R_0)^2]^{3/2}} (\vec{e}_z) \quad (9)$$

$$\vec{H}_s(r) = \frac{3R_0}{2\pi\epsilon_0\mu_0} \sum_{n=1}^{\infty} \frac{a_n q_n}{[r^2 + (a_n R_0)^2]^{5/2}} (\vec{e}_\phi) \quad (10)$$

where $\epsilon_0$ and $\mu_0$ are the permittivity and permeability of free space, $R_0$ is the tip radius, $\vec{e}_r$ and $\vec{e}_f$ are the unit vectors along the directions of the cylindrical coordinates r and z, $a_n R_0$ and $q_n$, are the position and charge of the nth image inside the tip, respectively. $a_n$ and $q_n$ have the following iterative relations:

$$\begin{cases} a_n = 1 + a_0 - \dfrac{1}{1 + a_0 + a_{n-1}} \\ q_n = \dfrac{q_{n-1}}{1 + a_0 + a_{n-1}} \end{cases} \quad (11)$$

with initial conditions: $a_1 = 1 + a_0$ and $q_1 = 4\pi\epsilon_0 R_0 V_0$, where $a_0 = h/R_0$, h is the tip-sample distance and $V_0$ is the tip voltage. As equation 8 satisfies the Coulomb's law and the boundary conditions on both the surfaces of the tip and the conducting material, it is the correct and sole solution of this problem. Although this deals with electromagnetic waves here ($\vec{E}$ and $\vec{H}$ fields are related through the Maxwell equation), the electric field configuration solved here is identical to the electrostatic field configuration in various SPMs.

The typical $\vec{H}$ field intensity profile obtained from equation 10 (FIG. 9) forms the shape of a volcano. The radial distributions for different tip-sample distances are depicted in FIG. 10. The figure indicates that the size of caster (a measure of spatial resolution of the microscope) decreases and the intensity of the field increases with decreasing tip-sample distance, respectively.

The inventors analyze the system through an equivalent series RLC circuit of the resonator. The tip is represented as a small capacitor, C', whose capacitance depends on the tip-sample interaction, parallel to the main capacitor of the resonant circuit. The relative resonant frequency shift is then proportional to the variation of C'. This variation can also be represented by the variation of the total charge on the tip, i.e. the sum of all sample-induced (image) charges:

$$\frac{\Delta f}{f} = -A \left\{ \sum_{n=1}^{\infty} q_n - q_1 \right\} = -A \sum_{n=2}^{\infty} q_n \quad (12)$$

This result is universal for all conducting materials (independent of conductivity) if the good metal condition is satisfied, i.e. $\sigma \gg \omega\epsilon$, where $\sigma$, $\epsilon$ are the conductivity, dielectric constant of the conducting material respectively, and $\omega$ is the circular frequency of the microwave (e.g., $\sigma/\omega\epsilon$ of Cu at 1 GHZ is on the order of $10^9$) FIG. 11 shows the measured $f$ as a function of tip-sample distance for Cu and the best fit to equation 12. The fitting determines $A = 2.82 \times 10^{-3}$ and $R_0 \approx 8 \, \mu m$ (consistent with observation).

To calculate the energy dissipated inside the conducting materials, the second order approximation and subsequently the refraction of evanescent electromagnetic wave on the surface of conducting materials and the decay behavior inside the materials must be considered. In the following paragraphs, the inventors will first discuss the refraction of evanescent electromagnetic waves on the surface of conducting materials. Then, the wave decay and dissipation inside the conducting materials are computed to derive the conductivity quantitatively from the SEMM signals.

The wave equations for electromagnetic waves in air and in conducting materials have the form of:

$$\begin{cases} \nabla^2 u + k_0^2 u = 0 & z < 0 \text{ (in air)} \\ \nabla^2 u + k_c^2 u = 0 & z \geq 0 \text{ (in conducting material)} \end{cases} \quad (13)$$

where u is any component of the electromagnetic wave, $k_0$ and $k_c$ are (complex) eigen-wave vectors for air and conducting material, respectively. $k_c^2 = \omega^2 \epsilon \mu (1 + i\sigma/\omega\epsilon)$ and $k_0^2 = \omega^2 \epsilon_0 \mu_0$, where $\mu$ is the permeability of the conducting material. $|k_c^2| \gg k_0^2$ even for lightly doped semiconductors (e.g. Si with dopant level of $10^{15}$ and resistivity of 3 $\Omega$cm) in the microwave frequency range of <10 GHz ($|k_c^2/k_0^2| \geq 60$).

From the boundary condition, when a wave is incident on the surface of conducting material from air (either propagating or evanescent), the lateral component of the wave vector crosses the interface continuously, i.e. $\bar{k}_0 \times \bar{n} = \bar{k}_c \times \bar{n}$, where $\bar{n}$ is the unit vector perpendicular to the interface, $\bar{k}_c$ represents the refracted wave vector of $\bar{k}_0$. When the incident wave is a propagating wave, the perpendicular component of its wave vector in air, $k_{0z} (= k_0 \cos\theta$, where $\theta$ is the incident angle), is real, and the lateral component, $k_{0r} (= \sqrt{k_0^2 - k_{0z}^2} = k_0 \sin\theta$) is limited to be less than $k_0$. Therefore, the refracted wave vector inside the conducting material of a propagating wave is always nearly perpendicular to the surfaces, i.e. $k_{cz} = \sqrt{k_c^2 - k_{0z}^2} \approx k_c$ because $k_{0r}$ is negligible compared to $|k_c|$. Consequently, the decay length is independent of the incident angle. From this point of view, it is usually stated that the conducting material has a unique surface impedance (or surface resistance) at a certain frequency independent of the incident angle (i.e. the lateral component of the wave vector) of the incident electromagnetic wave in the microwave region. It is based on this fact that the conventional skin-depth concept is derived. However, the situation is completely different for evanescent waves. In this situation, the corresponding $k_{0r}$ can be any value, comparable or even larger than $|k_c|$, and is no longer negligible. As a result, the decay length (determined by the imaginary part of $k_{cz}$) depends on $k_{0r}$ and must be calculated for each $k_{0r}$ value. The classical skin-depth concept fails here. Any theory on evanescent wave microscopy of conducting materials that does not specifically consider this fact is flawed.

To further elaborate the above analysis, the inventors expand the surface field $\overline{H}_s(r)$ into different lateral components using the concept of the spatial frequency as in Fourier optics:

$$\vec{H}_s(k_{0r}) = \frac{1}{2}\int \vec{H}_s(\vec{r})\exp(i\vec{K}_{0r}\cdot\vec{r})ds \qquad (14)$$

(14)
The calculated spatial frequency spectra for different ratios of tip-sample distances to tip radius ($a_0$) are shown in FIG. 12. It is clear that a cut-off spatial frequency exists for certain $R_0$ and $a_0$. It is also clear from the figure that the smaller the tip-sample distance (i.e. smaller the $a_0/R_0$) is, the more intense the high spatial frequency components are. Also found in FIG. 12 is that the increase of the intensity with respect to the decrease of $a_0$ is very rapid in the high $k_{0r}$ range and quite slow in the low $k_{0r}$ range of the spectra. In other words, the field intensity increase associated with the decrease of the tip-sample distance is mainly concentrated in the high spatial frequency region.

The corresponding perpendicular wave vector component inside the conducting material $k_{cz}$ can be obtained:

$$k_{cz} = \sqrt{k_c^2 - k_{0r}^2} = \sqrt{\frac{2i}{\delta^2} - k_{0r}^2} = k_{cz}^r + ik_{cz}^i \qquad (15)$$

where $k_{cz}^r$ and $k_{cz}^i$ denote the real and imaginary parts of $k_{cz}$, $\sigma=2\sigma/(\omega\mu\epsilon)$ is the classical skin-depth for metals and semiconductors, or penetration depth for superconductors. The corresponding electromagnetic field inside the conducting material has the form of $$\overline{H}_c(k_{0r})=\overline{H}_s(k_{0r})\exp[i(k_{cz}'z+k_{0r}r)-k_{cz}^i z]$$
(16)

$$\overline{E}_c(k_{0r})=\overline{\nabla}\times\overline{H}_c(k_{0r})/(\sigma-i\omega\epsilon)$$
(17)

and the total power flowing into and dissipated in the conducting material can be derived as:

$$S = \int \vec{n}\cdot\vec{S}dk_{0r}^2 = \frac{1}{2}\int \text{Re}\{\vec{n}\cdot(\vec{E}_c\times\vec{H}_c^*)\}dk_{0r}^2 \qquad (18)$$

(18)
where $$\vec{S} = \frac{1}{2}\text{Re}\{\vec{E}\times\vec{H}^*\}$$

is the Poynting vector. The Q shift caused by the power dissipated in the conducting material is:

$$\Delta\frac{1}{Q} = BS \qquad (19)$$

(19)
where B is a constant which can be obtained by calibration in a fashion similar to the A in equation 12.

If $k_{0r}\ll 1/\delta$, the above approach yields the same result as the classical skin-depth approach. However, the situation changes dramatically if $k_{0r}\sim 1/\delta$ or $k_{0r}\gg 1/\delta$. This is clearly demonstrated in FIGS. 12–14.

Also shown in FIG. 12 is the measured Q-distance curve and its best fit with equation 19 for Cu. The fit gives B=1.52×10$^{-7}$ and a conductivity of 6.2×10$^7$ S/m (characterized with the conventional skin-depth of $\delta\approx 2$ $\mu$m which is in good agreement with the conductivity of Cu (5.8×10$^7$ S/M). Plot together is the fit using the classical skin-depth concept. The difference is quite large in the region of small tip-sample distance.

Measurement of other Electrical Parameters using the Inventive SEMM

Other electrical parameters such as capacitance and Coulomb force can be measured quantitatively using the inventive SEMM. The electric field configuration solved here is identical to the static electric field configuration in various SPMs, such as scanning capacitance microscopy. The complete expression for the capacitance between the tip and sample can be written as $$C' = \frac{\sum_{n=1}^{\infty} q_n}{V_0}$$

for both conducting and dielectric samples. For conducting materials, the inventors found that when the distance is less than one tenth of the tip radius, the capacitance can be expressed very well with the following equation:

$$C^1=-1.26\times 10^{-10} R_0 \log(a_0)+1.11\times 10^{-10} R_0 (\text{Farad})$$

The Coulomb force between tip and sample is $$F = \frac{d\left(\frac{1}{2}C'V_0^2\right)}{dh} = -2.74\times 10^{-11}\frac{R_0}{h}V_0^2(\text{Newton})$$

These relations can be used to obtain quantitative microscopy for various SPMs.

Distance Regulation of a SEMM

Rapid progress in the electronic/optical industries requires the ability to image electrical properties with high resolution. The inventors have developed a scanning evanescent electromagnetic microscope (SEMM) capable of quantitative measurements of dielectric properties and surface resistance with submicron resolution. By monitoring the resonance frequency ($f_r$) and quality factor (Q) of a coaxial cavity, the inventors measure the dielectric properties of the sample. The shift in $f_r$ corresponds to the dielectric constant of the material ($\epsilon$) while the shift in Q corresponds to the tangent loss (tan $\delta$). By modeling the tip as a monopole and calculating a series of image charges, the inventors estimate the local $\epsilon$ and tan $\delta$. Since the tip radius determines the extent of the field distribution, this microscope is capable of submicron resolution. To enable the quantitative characterization of materials, it is useful to operate at a known distance. The inventors have operated in a soft contact mode, but this mode degrades resolution and even soft contact can damage the tip and sample. Here the inventors describe several different means to regulate the tip-sample separation and allow quantitative non-constant measurements of metallic and insulating surfaces with high resolution.

Quantitative modeling of the SEMM response has been performed in the case of metals and insulators. The resultant curve has been fitted theoretically (FIG. 11). For the case of good metals, the resultant shift in $f_r$ does not depend appreciably on the surface resistance. However, the shift in Q is a function of the surface resistance. Since the frequency shift does not vary with conductivity, it can be used to control the tip-sample separation by maintaining the separation so as to induce a constant frequency shift. Through methods, the surface topography can be imaged. Through quality factor measurements and theoretical calculations, the conductivity of the metal can be imaged simultaneously.

Metals: For the case of metals, as the shift in $f_r$ is essentially constant, a constant tip-sample separation can be maintained by adjusting the tip-sample separation to maintain a constant $f_r$ in the cavity. The ability to perform non-contact imaging of the surface resistance opens up a variety of possible applications. One such, of some interest to the microwave community, is the profiling of outgrowths in high $T_c$ films.

A quantitative, analytic model for the tip-response for dielectric and metallic material was developed. Since the SEMM operates in the extreme near-field region, with resolution $\sim\lambda/10^6$, the quasi-static approximation can be employed. The local electrical properties were estimated by modeling the tip as a metallic sphere and calculating a series of image charges. Quantitative modeling of the SEMM response was performed in the cases of metals and insulator. Quantitative comparisons of the tip response with the modeled response have been conducted as a function of distance and sample properties and have demonstrated accuracy within 5% on sample of widely varying dielectric and metallic properties.

For metals, the resulting expression is $$\Delta f/f = -A\Sigma q_n/V_0,$$

where the summation is from n=2 to infinity, and where A is a geometric factor. The $q_n$ is given by an iterative relation:

$$q_n = q_{n-1}/(1+a_0+a_{n-1}); \text{ and}$$

$$a_n = 1+a_0 - [1/(1+a_0+a_{n-1})]$$

with initial conditions: $a_1 = 1+a_0$ and $q_1 = 4\pi\epsilon_0 R_0 V_0$, where $a_0 = g/R_0$, and g is the tip-sample separation, $R_0$ the tip radius, and $V_0$ the tip voltage. For $a_0 \ll 1$, this expression converges slowly owing to the slow divergence of image charges from the tip. However, the expression $$\Delta f/f = -1.14 A \log_{10}(a_0)$$

agrees well for $a_0 < 0.1$. Since these expressions are independent of conductivity for good metals, the frequency shift is used as a distance measure and the surface resistance is measured separately.

By varying the tip-sample separation over a metallic substrate, the frequency response can be measured. After calibration of the cavity to determine the geometrical constant A, the theoretical curve can be fit and $R_0$ and the absolute separation at a given $f_r$ may be extracted. (FIG. 17)

The design of the inventors microscope is based on a previously constructed SEMM. From the calibration curves, a frequency $f_{RF}$ is chosen to correspond to some tip-sample separation. To regulate the tip-sample distance, a phase-locked loop is employed, where connection 31 on FIG. 2 is open. A constant RF frequency $f_{RF}$ is input into the cavity and the cavity output is mixed with a signal coming from a reference path. The length of the reference path is adjusted so that the output of the mixer is zero when $f_r$ matches $f_{RF}$. The output of the phase detector is fed to an integrator, which regulates the tip-sample distance by changing the extension of a piezoelectric actuator (Burleigh PZS-050) to maintain the integrator output near zero. For samples exhibiting a uniform frequency shift, this corresponds to a constant tip-sample separation. The measurement is limited to approximately 30 Hz by vibration and the rather low resonance frequency of the actuator. To measure Q, the amplitude of the cavity resonance is measured simultaneously. Using the calibration curves ($f_r$ versus d), a resonance frequency that corresponds to some chosen tip-sample separation is chosen for the cavity. The resonance frequency chosen is fed into the cavity and the output of the phase detector is used to regulate the applied voltage to the piezoelectric actuator. Sample topography is measured by monitoring the variation in voltage applied to the actuator.

To demonstrate the ability to separate topographic and electrical information, the inventors imaged a set of metallic squares of varying height on a metallic film (FIG. 18). This sample consists of 100 nm, 200 nm, and 400 nm Ag squares on a 2.1 $\mu$m Ag substrate on a sapphire substrate. They were 250 $\mu$m by 250 $\mu$m and separated by a distance of 60 $\mu$m. The topographic image shows clear variations in height for the different squares. The loss image is essentially featureless.

To demonstrate the ability to image surface resistance, the inventors imaged squares of varying resistivity (FIG. 19). This sample consists of Mn, Cr, and Zr squares deposited on 75 mn Pt on a silicon substrate. The variations in the topographic image correspond to real variations in height as measured by a profilometer. The variations in the loss image are clearly visible and correspond to variations in resistivity.

Poled Single Crystals: For materials in which the frequency shift is constant (i.e. poled single crystals), the tip-sample distance (d) can be controlled by adjusting the distance to maintain a constant frequency shift. The inventors have implemented a feedback loop using a phase-sensitive detector to force a piezoelectric actuator (Burleigh PZS-050) to maintain a constant $f_r$. For samples exhibiting a uniform frequency shift, this corresponds to a constant tip-sample separation. Sample topography is measured by monitoring the variation in voltage applied to the actuator. By simultaneous measurement of an additional signal, variations in sample properties can be imaged in conjunction with topography. Variations in the transmitted power correspond to variations in tangent loss or surface resistance. By application of an alternating voltage with frequency between that of the tip-sample feedback loop and the cavity bandwidth and measurement of the variation in the output of the phase detector, the first order nonlinear dielectric constant ($\epsilon_{ijk}$) can also be measured. (FIG. 15) This image was taken of a periodically poled single-crystal LiNbO$_3$ wafer. The topographic image is essentially featureless, with the exception of a constant tilt. The nonlinear image features a reversal in phase by the reversal of polarization in the alternating domains.

Other: Apertureless reflectance-mode near-field optical microscopy (apertureless NSOM) can also be used for distance regulation of a SEMM. The variation of material properties at optical frequencies is less than the variation at lower frequencies, making apertureless NSOM suitable for distance regulation. 'Conventional' near-field optics relies on the use of a tapered waveguide geometries of transmission or absorption. This waveguide can either confine or sample light from a region near an aperture with size smaller than the wavelength of light. This form of near-field optics requires the fabrication of a complex probe. In apertureless NSOM, a sharp, optically conducting tip is moved close to the sample and a highly focused spot illuminates the tip-sample region. This contrasts with earlier apertureless NSOMs in which the tip was illuminated from below. These apertureless NSOMs are limited to use on optically transparent samples. The scattered light varies with the tip-sample separation and may be used for distance control, either by measurement of the amplitude or of the polarization of the scattered light. To reduce the effects of background illumination, the inventors propose the use of a Schwartzchild lens, where a dark central region reduces the scattered background. Additionally, a vertical dither may be used to reduce the effects of a far-field background. This dither should enable the detection of only that component of the optical signal that varies over small length scales. This method allows for control of the tip-sample separation in an SEMM with high resolution over a broad range of substrates in combination with simultaneous measurements of the sample's electrical properties.

The tip-sample distance may also be regulated by differential measurement of the frequency shift. Vibrating the sample position, for example by placing a piezoelectric element under the sample, causes a change in resonance frequency and its harmonics. These changes are measured using, for example, a lock-in amplifier.

The changes in resonance frequency will have sharper distance dependence than the microscope signal and can be used for distance control. For frequency shifts whose distance dependence resembles a power law, the variation of $f_r$ at the frequency of the cavity dither will vary inversely with an additional factor of the tip-sample separation. If this vertical dither is small by comparison to the tip-sample separation, the total variation in acquired signal will be small, permitting simultaneous measurement of topography and the sample properties.

The frequency shift and harmonic intensity are independent functions of the dielectric constant and the tip-sample distance, g, and give raise to two independent equations:

$$f_r = f_1(\epsilon, g) \quad (20)$$

$$\left.\frac{d(f_r)}{dg}\right|_{r=\omega} = f_2(\epsilon, g) \quad (21)$$

where the $f_r$ are described in equation 5 above. To use equation 5 in equation 20, $\Delta f_r = f_r - f_0.0$ In addition, the denominator, in equation 5, $f_r$ is substituted with $f_0$, which will have very little affect on the outcome because of the relative size of the numbers. Equation 5 is then solved for $f_r$ and used as equation 20. Equation 21 is the first derivative taken with respect to g. The equations 20 and 21 are solved simultaneously to yield the dielectric constant, $\epsilon$, and the gap distance, g.

The description of illustrative embodiments and best modes of the present invention is not intended to limit the scope of the invention. Various modifications, alternative constructions and equivalents may be employed without departing from the true spirit and scope of the appended claims.

We claim:

1. A scanning electromagnetic wave microscope comprising:
   a) a scanning electromagnetic wave microscope probe having an aperture in an electrically conducting endwall and having a center conducting element comprising a sharpened tip that extends through the aperture beyond the endwall;
   b) a frequency detector for calculating an initial and a final resonant frequency of a resonator, called a frequency shift;
   c) a power detector for measuring electromagnetic energy values; and
   d) a computer programmed to calculate an initial and final ratio of electromagnetic energy dissipated and stored in the resonator, called a Q shift.

2. The microscope of claim 1 wherein the computer is programmed to calculate a dielectric constant of a dielectric material near an electrode probe tip as a function of the shift of resonant frequency or change in reflected wave caused by the proximity of the dielectric material to the probe tip.

3. The microscope of claim 2 wherein the equation computer is programmed to calculate the dielectric constant from the $$\frac{\Delta f_r}{f_r} = -\frac{\int_v (\Delta\epsilon \vec{E}_1 \cdot \vec{E}_0 + \Delta\mu \vec{H}_1 \cdot \vec{H}_0) dv}{\int_v (\epsilon_0 E_0^2 + \mu_0 H_0^2) dv}$$

where $f_r$ is the resonant frequency, $\epsilon$ is the complex dielectric constant, $E_1$ is the electric field after perturbation, $E_0$ is the electric field before perturbation, $\mu$ is the complex magnetic permeability of the sample, $H_1$ is the magnetic field after perturbation, $H_0$ is the magnetic field before perturbation, v is the volume in which the fields reside, $\epsilon_0$ is the dielectric constant of free space, and $\mu_0$ is the magnetic permativity of free space.

4. The microscope of claim 1 wherein the computer is programmed to calculate a loss tangent of a dielectric material near an electrode probe tip as a function of the shift of the Q shift caused by the proximity of the dielectric material to the probe tip.

5. The microscope of claim 4 wherein the computer means are programmed to calculate the loss tangent from the equation $$\Delta\left(\frac{1}{Q}\right)_d = \frac{\int_v (\Delta\epsilon'' \vec{E}_1 \cdot \vec{E}_0 + \Delta\mu'' \vec{H}_1 \cdot \vec{H}_0) dv}{\int_v (\epsilon_0 E_0^2 + \mu_0 H_0^2) dv}$$

where Q is the quality factor, $\epsilon''$ is the imaginary component of the dielectric constant, $E_1$ is the electric field after perturbation, $E_0$ is the electric field before perturbation, $\mu''$ is the imaginary component of the magnetic permeability, $\epsilon_0$ is the dielectric constant of free space, $\mu_0$ is the magnetic permeability of free space, and v is the volume in which the electric and magnetic fields exist.

6. The microscope of claim 1 wherein the power detector is a diode detector.

7. The microscope of claim 1 wherein the frequency detector comprises a phase shifter, a phase detector, and an integrator.

8. The microscope of claim 1 wherein the probe has a resonator and a cavity wherein the cavity is filled with a dielectric material.

9. The microscope of claim 8 wherein the dielectric material is sapphire.

10. The microscope of claim 8 wherein the dielectric material is $SrTiO_3$.

11. The microscope of claim 1 wherein the probe tip extends a distance beyond the aperture between about ⅓ and about 3 times the largest distance across the aperture.

12. The microscope of claim 1 wherein the aperture in a resonator endwall is circular and the diameter is between about twenty nanometers and about three millimeters.

13. The microscope of claim 1 further comprising a frequency generator wherein the frequency generator comprises a voltage controlled oscillator.

14. The microscope of claim 13 wherein the frequency generator operates in the microwave region.

15. The microscope of claim 1 further comprising a digital frequency controller.

* * * * *